US012754489B2

(12) United States Patent
Komiya et al.

(10) Patent No.: US 12,754,489 B2
(45) Date of Patent: Oct. 6, 2026

(54) TONER, TONER PRODUCTION METHOD, AND IMAGE-FORMING METHOD

(71) Applicant: CANON KABUSHIKI KAISHA, Tokyo (JP)

(72) Inventors: Yuta Komiya, Kanagawa (JP); Kosuke Fukudome, Tokyo (JP); Kenta Kamikura, Kanagawa (JP); Satoshi Arimura, Shizuoka (JP); Toru Ishii, Shizuoka (JP); Shohei Tsuda, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 544 days.

(21) Appl. No.: 18/360,142

(22) Filed: Jul. 27, 2023

(65) Prior Publication Data

US 2024/0061355 A1 Feb. 22, 2024

(30) Foreign Application Priority Data

Aug. 5, 2022 (JP) ................................ 2022-125630
Jul. 13, 2023 (JP) ................................ 2023-115035

(51) Int. Cl.
*G03G 9/08* (2006.01)
*G03G 9/087* (2006.01)
(Continued)

(52) U.S. Cl.
CPC ....... *G03G 9/08702* (2013.01); *G03G 9/0825* (2013.01); *G03G 9/08782* (2013.01);
(Continued)

(58) Field of Classification Search
CPC ............. G03G 9/08702; G03G 9/0825; G03G 9/08782; G03G 9/009783; G03G 15/0822; G03G 2215/085
See application file for complete search history.

(56) References Cited

U.S. PATENT DOCUMENTS 8,828,639 B2 9/2014 Kamikura
9,034,549 B2 5/2015 Shiotari
(Continued)

FOREIGN PATENT DOCUMENTS

JP 2018-54705 A 4/2018
JP 2021-9250 A 1/2021

*Primary Examiner* — Amber R Orlando
*Assistant Examiner* — Charles Collins Sullivan, IV
(74) *Attorney, Agent, or Firm* — VENABLE LLP

(57) ABSTRACT

A toner comprising a toner particle, the toner particle comprising a binder resin, wherein the toner particle comprises a monoester wax, and a fatty acid metal salt A is present on a surface of the toner particle, when X(A) is defined as a coverage ratio of the surface of the toner particle by the fatty acid metal salt A, as determined by X-ray photoelectron spectroscopy and S(A) is defined as the coverage ratio of the surface of the toner particle by the fatty acid metal salt A, as determined by analysis of a scanning electron microscope image, the formulae below are satisfied:

$$S(A) \geq 0.03 \quad (1)$$

$$X(A) \leq 0.250 \quad (2)$$

$$0.248 \leq S(A)/X(A) \leq 1.000. \quad (3)$$

14 Claims, 3 Drawing Sheets

(51) Int. Cl.

*G03G 9/097* (2006.01)
*G03G 15/08* (2006.01)

(52) U.S. Cl.

CPC ..... *G03G 9/09783* (2013.01); *G03G 15/0822* (2013.01); *G03G 2215/085* (2013.01)

(56) References Cited

U.S. PATENT DOCUMENTS

| | | | | |
|---|---|---|---|---|
| 9,040,216 | B2 | 5/2015 | Fukudome | |
| 9,116,448 | B2 | 8/2015 | Terauchi | |
| 9,134,637 | B2 | 9/2015 | Hotta | |
| 9,141,012 | B2 | 9/2015 | Moribe | |
| 9,256,148 | B2 | 2/2016 | Fujikawa | |
| 9,261,806 | B2 | 2/2016 | Moribe | |
| 9,285,697 | B2 | 3/2016 | Fukudome | |
| 9,470,993 | B2 | 10/2016 | Nishikawa | |
| 9,575,425 | B2 | 2/2017 | Naka | |
| 9,588,450 | B2 | 3/2017 | Tsuda | |
| 9,594,323 | B2 | 3/2017 | Fujikawa | |
| 9,606,462 | B2 | 3/2017 | Nomura | |
| 9,658,546 | B2 | 5/2017 | Tanaka | |
| 9,715,188 | B2 | 7/2017 | Terauchi | |
| 9,772,570 | B2 | 9/2017 | Tsuda | |
| 9,778,583 | B2 | 10/2017 | Terauchi | |
| 9,804,519 | B2 | 10/2017 | Suzumura | |
| 9,857,707 | B2 | 1/2018 | Tsuda | |
| 9,880,478 | B2 | 1/2018 | Shimano | |
| 9,904,195 | B2 * | 2/2018 | Matsui | G03G 9/09708 |
| 9,927,728 | B2 | 3/2018 | Arimura | |
| 9,946,179 | B2 | 4/2018 | Arimura | |
| 9,952,523 | B2 | 4/2018 | Shimano | |
| 9,971,263 | B2 | 5/2018 | Fukudome | |
| 10,012,919 | B2 | 7/2018 | Matsui | |
| 10,012,923 | B2 | 7/2018 | Sano | |
| 10,101,683 | B2 | 10/2018 | Nishikawa | |
| 10,156,800 | B2 | 12/2018 | Tsuda | |
| 10,197,934 | B2 | 2/2019 | Matsui | |
| 10,228,627 | B2 | 3/2019 | Nagashima | |
| 10,289,016 | B2 | 5/2019 | Fukudome | |
| 10,295,921 | B2 | 5/2019 | Ohmori | |
| 10,303,074 | B2 | 5/2019 | Yamawaki | |
| 10,310,396 | B2 | 6/2019 | Kamikura | |
| 10,338,487 | B2 | 7/2019 | Kamikura | |
| 10,345,726 | B2 | 7/2019 | Nakamura | |
| 10,353,308 | B2 | 7/2019 | Hatakeyama | |
| 10,401,750 | B2 | 9/2019 | Nakamura | |
| 10,429,757 | B2 | 10/2019 | Yoshida | |
| 10,503,090 | B2 | 12/2019 | Tominaga | |
| 10,539,893 | B2 | 1/2020 | Tanaka | |
| 10,539,899 | B2 | 1/2020 | Nakamura | |
| 10,545,420 | B2 | 1/2020 | Kinumatsu | |
| 10,545,422 | B2 | 1/2020 | Yamawaki | |
| 10,551,758 | B2 | 2/2020 | Tanaka | |
| 10,578,990 | B2 | 3/2020 | Tsuda | |
| 10,635,010 | B2 | 4/2020 | Kamikura | |
| 10,698,327 | B2 | 6/2020 | Nagashima | |
| 10,732,530 | B2 | 8/2020 | Matsui | |
| 10,782,623 | B2 | 9/2020 | Yoshiba | |
| 10,845,722 | B2 | 11/2020 | Nishikawa | |
| 10,859,933 | B2 | 12/2020 | Kinumatsu | |
| 10,877,387 | B2 | 12/2020 | Fukudome | |
| 10,877,388 | B2 | 12/2020 | Aoki | |
| 10,877,389 | B2 | 12/2020 | Kamikura | |
| 10,895,815 | B2 | 1/2021 | Kamikura | |
| 10,976,678 | B2 | 4/2021 | Yamawaki | |
| 11,003,103 | B2 | 5/2021 | Kinumatsu | |
| 11,092,905 | B2 | 8/2021 | Fukudome | |
| 11,099,493 | B2 | 8/2021 | Komiya | |
| 11,112,708 | B2 | 9/2021 | Uratani | |
| 11,112,712 | B2 | 9/2021 | Matsunaga | |
| 11,169,458 | B2 | 11/2021 | Toyoizumi | |
| 11,175,600 | B2 | 11/2021 | Uchiyama | |
| 11,181,839 | B2 | 11/2021 | Yamashita | |
| 11,181,840 | B2 | 11/2021 | Nagata | |
| 11,181,844 | B2 | 11/2021 | Nagaoka | |
| 11,181,846 | B2 | 11/2021 | Kinumatsu | |
| 11,249,408 | B2 | 2/2022 | Tsuda | |
| 11,256,187 | B2 | 2/2022 | Ogaki | |
| 11,287,758 | B2 | 3/2022 | Matsui | |
| 11,314,178 | B2 | 4/2022 | Kenmoku | |
| 11,333,989 | B2 | 5/2022 | Unno | |
| 11,347,157 | B2 | 5/2022 | Kamikura | |
| 11,531,282 | B2 | 12/2022 | Kamikura | |
| 2021/0003932 | A1 * | 1/2021 | Tsuda | G03G 9/0821 |
| 2022/0146952 | A1 | 5/2022 | Komiya | |
| 2022/0146955 | A1 | 5/2022 | Nozaki | |
| 2022/0206402 | A1 | 6/2022 | Uratani | |
| 2022/0214629 | A1 | 7/2022 | Kenmoku | |
| 2022/0214630 | A1 | 7/2022 | Kamikura | |
| 2022/0291601 | A1 | 9/2022 | Katsura | |
| 2023/0042289 | A1 | 2/2023 | Tanaka | |
| 2023/0047510 | A1 | 2/2023 | Tsuda | |
| 2023/0080900 | A1 | 3/2023 | Kamikura | |
| 2023/0117448 | A1 | 4/2023 | Fukudome | |
| 2023/0122974 | A1 | 4/2023 | Kagawa | |
| 2023/0161277 | A1 | 5/2023 | Komiya | |
| 2023/0273538 | A1 | 8/2023 | Fukudome | |
| 2023/0314974 | A1 | 10/2023 | Tsuda | |

* cited by examiner

TONER, TONER PRODUCTION METHOD, AND IMAGE-FORMING METHOD

BACKGROUND OF THE INVENTION

Field of the Invention

The present disclosure relates to a toner used in an electrophotographic image forming apparatuses, to a toner production method, and to an image-forming method.

Description of the Related Art

In recent years, higher speed and better image quality have come to be required from electrophotographic image forming apparatuses such as copiers and printers. There is moreover a growing demand for energy savings and longer-life products, driven by global efforts aimed at reducing environmental impact. In terms of a transport environment from the point in time at which toner is produced until the toner is used by a consumer, marine transport may be involved in which the shipping route crosses the equator; in spite of this, high-quality images need still to be provided even after the toner has experienced harsh transport in high temperature and high humidity.

To meet these demands, the toner is required to exhibit excellent low-temperature fixability, as well as storage stability and durability that enable high-quality image output, also upon long-term usage after the toner has experienced a harsh transport environment.

The use of monoester waxes as release agents in toners has been addressed for the purpose of obtaining toners excellent in low-temperature fixability. Monoester waxes, which melt and liquefy on account of heat, are compatible with binder resins of toner, thanks to which the melt viscosity of the toner is lowered and a toner can be obtained that is excellent in low-temperature fixability.

Japanese Patent Application Publication No. 2021-009250 discloses a toner characterized in that fine particles containing a fatty acid metal salt are present on the surface of a toner particle that contains a binder resin. The above citation indicates that a monoester wax can be used as a release agent.

Japanese Patent Application Publication No. 2018-054705 discloses a toner for electrostatic image developing, the toner containing a toner particle, and composite particles that contain lubricant particles and reverse-polarity particles having a charging performance of reverse polarity to that of the lubricant particles, and such that the reverse-polarity particles are fixed to the surface of the lubricant particles, thereby forming a composite body. The above citation indicates also that a monoester wax can be used as a release agent.

SUMMARY OF THE INVENTION

In the above citations, the melting characteristics of toner are improved through the use of a monoester wax as a releasing agent. In a case however where the number of added parts of the fatty acid metal salt is small, development streaks occur in the transport direction of a recording medium, as the number of outputted prints increases upon continuous image output in a high-temperature, high-humidity environment after storage in a transport mode that envisages transport in a high-temperature, high-humidity environment.

In a case by contrast where the number of added parts of the fatty acid metal salt is large, improvements are observed in terms of the abovementioned development streaks. Upon continuous image output in a low-temperature, low-humidity environment, however, toner comes off the developer carrier as the number of outputted prints increases, which gives rise to image damage (blotting phenomenon).

Such being the case, the toners in the above citations leave room for improvement in terms of combining suppression of development streaks upon continuous image output in a high-temperature, high-humidity environment following a harsh transport environment in a high-temperature, high-humidity environment, and suppression of blotting upon continuous image output in a low-temperature, low-humidity environment.

The present disclosure provides a toner that exhibits good low-temperature fixability, and at the same time, combines suppression of development streaks upon continuous image output in a high-temperature, high-humidity environment following a harsh transport environment in a high-temperature, high-humidity environment, with suppression of blotting upon continuous image output in a low-temperature, low-humidity environment.

The present disclosure relates to a toner comprising a toner particle, the toner particle comprising a binder resin, wherein the toner particle comprises a monoester wax, a fatty acid metal salt A is present on a surface of the toner particle, when X(A) is defined as a coverage ratio of the surface of the toner particle by the fatty acid metal salt A, as determined by X-ray photoelectron spectroscopy and S(A) is defined as the coverage ratio of the surface of the toner particle by the fatty acid metal salt A, as determined by analysis of a scanning electron microscope image, X(A) and S(A) satisfy Formulae (1), (2) and (3) below:

$$S(A) \geq 0.03 \quad (1)$$

$$X(A) \leq 0.250 \quad (2)$$

$$0.248 \leq S(A)/X(A) \leq 1.000. \quad (3)$$

The present disclosure succeeds in providing a toner that exhibits good low-temperature fixability, and at the same time, combines suppression of development streaks upon continuous image output in a high-temperature, high-humidity environment following a harsh transport environment in a high-temperature, high-humidity environment, with suppression of blotting upon continuous image output in a low-temperature, low-humidity environment. Further features of the present invention will become apparent from the following description of exemplary embodiments with reference to the attached drawings.

DESCRIPTION OF THE EMBODIMENTS

Figure 1:
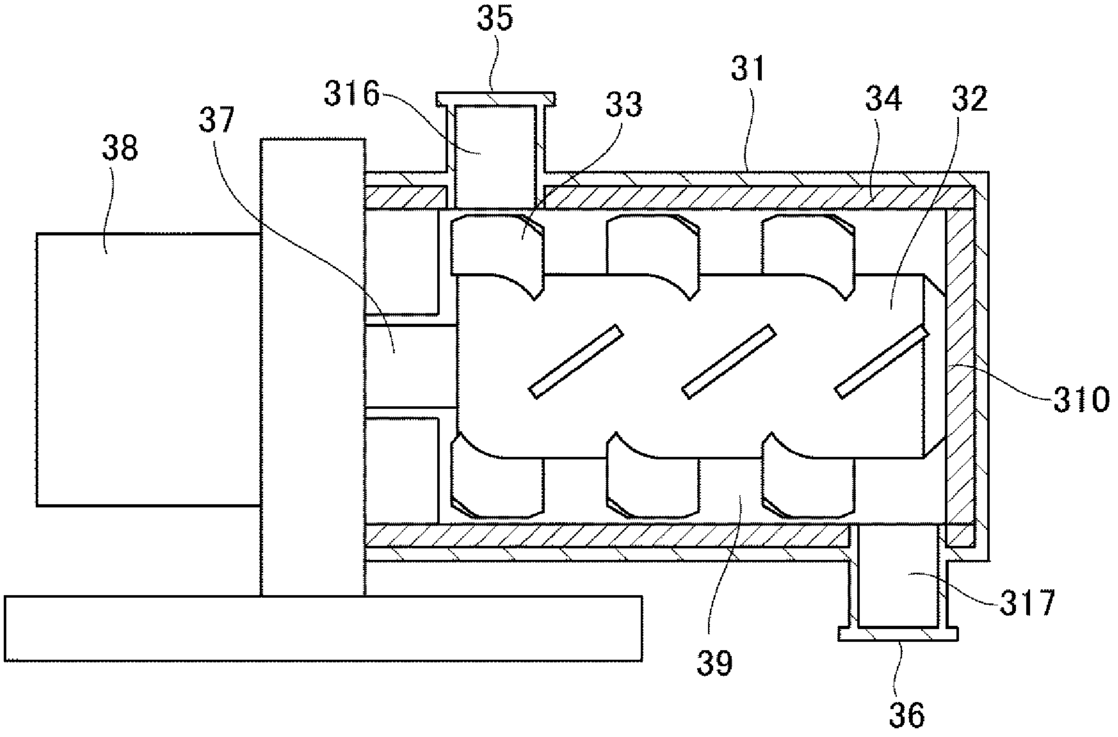
FIG. 1 is a schematic diagram of a mixing process apparatus.

In the present disclosure, the wordings "from XX to YY" and "XX to YY" expressing numerical value ranges mean numerical value ranges including the lower limit and the upper limit as endpoints, unless otherwise stated. When numerical value ranges are described stepwise, upper limits and lower limits of those numerical value ranges can be combined suitably.

The inventors studied thoroughly toners that exhibit good low-temperature fixability, and that allow combining suppression of development streaks in the case of continuous image output in a high-temperature, high-humidity environment, after having gone through a harsh transport environment in a high-temperature, high-humidity environment, and suppression of blotting in the case of continuous image output in a low-temperature, low-humidity environment.

Toners that utilize a monoester wax as a release agent have been studied as an approach to improving the low-temperature fixability of toner. That is because monoester waxes and binder resins exhibit high compatibility, and hence the binder resin is plasticized by the monoester wax upon application of heat; as a result, the melt viscosity of the toner is lowered and the toner can be fixed to a medium such as paper, even at low temperature.

However, when the toner particle is exposed to a high-temperature, high-humidity harsh environment during transport, an amorphous component of high molecular mobility and a low-melting-point component suffering from insufficient crystallization and that are present in the monoester wax contained in the toner particle, tend to exude towards the surface of the toner particle. Part of the exuded component is present on the toner particle surface, remaining in an amorphous state without crystallizing.

Herein the temperature of the toner storage container tends to rise upon continuous image output over long periods of time in a harsh high-temperature, high-humidity environment. This tendency is more prominent at a developing nip portion where the toner is rubbed against a developing member.

As a result, upon continuous image output in a high-temperature, high-humidity environment after transfer in the above harsh environment, the amorphous component of a wax having exuded onto the toner particle surface, at the developing nip portion, becomes a starting point for melt adhesion of the toner onto the developing member. It has been found that development streaks occur, in the transport direction, of the recording medium, on account of the formation of toner aggregates on the developing member.

In this respect, studies by the inventors have revealed that causing a given or greater amount of a fatty acid metal salt to be present on the surface of the toner particle is effective in terms of suppressing such development streaks.

Fatty acid metal salts are materials having long-chain alkyl groups, and that exhibit structural similarity to alkyl groups that make up monoester waxes. Fatty acid metal salts are extensible materials that deform readily. As described above, it is considered that a monoester wax contained in a toner particle is exudes to the toner particle surface, in the form of an amorphous component, in a harsh transport environment of high temperature and high humidity.

Herein the fatty acid metal salt is present on the toner particle surface, and accordingly the fatty acid metal salt acts as a crystal nucleating agent of the monoester wax, which arguably allows increasing the crystallization rate and the degree of crystallinity of the amorphous component of the exuded monoester wax. As a result, the exuded component of the wax having crystallized, with the fatty acid metal salt serving as nuclei, exhibits a high melting point; it is considered that, in consequence, the exuded component does not readily become a starting point of melt adhesion of toner onto the developing member, which should allow suppressing the occurrence of the above-described development streaks.

Meanwhile, it has been found that upon output of images over long periods of time in a low-temperature, low-humidity environment using a toner that contains a fatty acid metal salt in an amount necessary for suppressing development streaks, new image damage (blotting) occur due to detachment of the toner from the developer carrier.

The viscoelasticity of the binder resin on the toner particle surface tends to increase, and adhesion forces between the toner particle surface and the fatty acid metal salt tends to decrease. Therefore, when the toner is rubbed against the developing member at the developing nip portion in a low-temperature, low-humidity environment, the fatty acid metal salt migrates from the toner particle surface to the developing member, and contamination of the developing member is prone to occur.

When contamination of the member progresses as a result of continuous output over long periods of time, the toner fails to become sufficiently charged at the developing nip. The inventors consider that, as a result, electrostatic attachment forces between the toner and the developer carrier are weakened and the toner comes off the developer carrier, giving rise to blotting.

As a result of assiduous studies, the inventors have found that precise control of the state in which a fatty acid metal salt is present on the toner particle surface is important in order to suppress development streaks in a high-temperature, high-humidity environment and suppressing blots in a low-temperature, low-humidity environment, after the toner has experienced a harsh transport environment of high temperature and high humidity.

Concerning suppression of development streaks first, it is important to promote crystallization of the amorphous component of the monoester wax that exudes onto the toner particle surface in a harsh transport environment, and to reduce the wax component that is present, in an amorphous state, on the toner particle surface. Specifically, it is necessary to increase the chances of contact between the exuded wax and the fatty acid metal salt acting as a crystal nucleating agent on the outermost surface of the toner particle.

It is thus important to control not the content of the fatty acid metal salt contained in the toner, but the coverage ratio of the toner particle surface by the fatty acid metal salt that is in contact with the toner particle surface. The inventors have found that by exploiting the extensibility of the fatty acid metal salt, to control the coverage ratio thereof to a given or higher value, it becomes possible to crystallize, over a wide area of the toner particle surface, the amorphous component of the wax having exuded onto the toner particle surface, and suppress thus development streaks.

Concerning suppression of blotting next, it is important to curtail migration of the fatty acid metal salt from the toner particle surface to the developing member in the time of rubbing of the toner against the developing member at the developing nip portion, to suppress thus contamination of the developing member. At the developing nip portion the toner rolls as it passes therethrough, and stress acts as a result in a tangential direction and in a normal direction of the toner, assumed to be spherical; migration of the fatty acid metal salt are considered to be particularly influenced by forces in the tangential direction.

That is, when the fatty acid metal salt adheres, over a given height, to the toner particle surface, the fatty acid metal salt tends to be acted upon by larger forces in the tangential direction of the toner, and hence the fatty acid metal salt arguably tends to readily migrate to the developing member. Specifically, the inventors have found that migration of the fatty acid metal salt to the developing member can be suppressed, and the occurrence of blotting can likewise be forestalled, by controlling the amount of the fatty acid metal salt to a given amount and through control, to a desired coating state, of the state in which the fatty acid metal salt is present on the toner particle surface, by exploiting the extensibility of the fatty acid metal salt.

It therefore follows that the above-described performance can be brought out by virtue of the fact that the toner particle contains the binder resin and the monoester wax, and the surface of the toner particle contains the fatty acid metal salt, and through precise control of the state in which the toner particle surface is coated with the fatty acid metal salt and the state in which the fatty acid metal salt is present.

The present disclosure relates to a toner comprising a toner particle, the toner particle comprising a binder resin, wherein the toner particle comprises a monoester wax, a fatty acid metal salt A is present on a surface of the toner particle, when X(A) is defined as a coverage ratio of the surface of the toner particle by the fatty acid metal salt A, as determined by X-ray photoelectron spectroscopy and S(A) is defined as the coverage ratio of the surface of the toner particle by the fatty acid metal salt A, as determined by analysis of a scanning electron microscope image, X(A) and S(A) satisfy Formulae (1), (2) and (3) below:

$$S(A) \geq 0.03 \quad (1)$$

$$X(A) \leq 0.250 \quad (2)$$

$$0.248 \leq S(A)/X(A) \leq 1.000. \quad (3)$$

The toner will be explained next.

X(A) is defined as a coverage ratio of a surface of the toner particle by the fatty acid metal salt A, as determined by X-ray photoelectron spectroscopy. Further, S(A) is defined as the coverage ratio of the surface of the toner particle by the fatty acid metal salt A, as determined by analysis of a scanning electron microscope image. Such being the case S(A) satisfies Formula (1) below $$S(A) \geq 0.03 \quad (1)$$

The above Formula (1) prescribes that 3 area % or more of the toner particle surface is covered with the fatty acid metal salt A. The inventors speculate that S(A) represents a planar coverage ratio of the toner surface.

As pointed out above, in order to suppress development streaks upon continuous image output in a high-temperature, high-humidity environment, following a high-temperature, high-humidity harsh transport environment, it is necessary to increase the chances of contact between the exuded wax and the fatty acid metal salt A acting as a crystal nucleating agent, at the outermost surface of the toner particle.

Controlling S(A) to a high value involves controlling the coverage ratio of the toner particle surface by the fatty acid metal salt A to be high; by controlling herein S(A) to be 0.03 or higher it becomes possible to increase the chances of contact between the fatty acid metal salt A and the exuded wax at the outermost surface of the toner particle, and to suppress development streaks.

Further, S(A) is preferably 0.05 or higher, more preferably 0.06 or higher, and yet more preferably 0.10 or higher.

From the viewpoint of low-temperature fixability, S(A) is preferably 0.30 or lower, more preferably 0.25 or lower, and yet more preferably 0.20 or lower. Further, S(A) is for instance from 0.03 to 0.30, or from 0.05 to 0.25, or from 0.05 to 0.20, or from 0.06 to 0.20, or from 0.10 to 0.20.

Further, S(A) can be controlled on the basis of the number of added parts of the fatty acid metal salt A, and on the basis of the external addition conditions of the fatty acid metal salt A.

It is important that X(A) satisfies Formula (2) below.

$$X(A) \leq 0.250 \quad (2)$$

Elemental analysis down to a depth of about 5 nm from the surface of the toner particle can be accomplished by X-ray photoelectron spectroscopy. Formula (2) above signifies that the content of the fatty acid metal salt A in the toner particle is 25.0 area % or less in a depth range of about 5 nm from the toner surface. The inventors deem that X(A) denotes the abundance of the fatty acid metal salt A on the surface of the toner, including the depth range, and the vicinity thereof.

Controlling herein X(A) to a low value signifies controlling the content of the fatty acid metal salt A in the toner to be low, which entails a reduction in the frequency of migration from the toner to the developing member. Specifically, controlling X(A) to be 0.250 or lower allows herein curtailing the amount of fatty acid metal salt A migrating to the developing member, and allows suppressing blotting derived from contamination of the developing member.

Further, X(A) is preferably 0.220 or lower, more preferably 0.180 or lower, and yet more preferably 0.150 or lower. Although the lower limit is not particularly restricted, X(A) is preferably 0.010 or higher, more preferably 0.030 or higher, and yet more preferably 0.060 or higher. Further, X(A) is for instance from 0.010 to 0.250, or from 0.030 to 0.220, or from 0.060 to 0.180, or from 0.060 to 0.150.

Herein X(A) can be controlled on the basis of the number of added parts of fatty acid metal salt A.

Also, X(A) and S(A) must satisfy Formula (3) below.

$$0.248 \leq S(A)/X(A) \leq 1.000 \quad (3)$$

The above Formula (3) signifies that the proportion of the coverage ratio of the toner particle surface by the fatty acid metal salt A relative to the content of the fatty acid metal salt A in the above depth range of about 5 nm from the toner surface is from 24.8% to 100.0%.

It is found that S(A) is a planar coverage ratio of the surface of the toner, and X(A) represents the amount of fatty acid metal salt A that encompasses a certain depth range. Therefore, the fact that the value of S(A)/X(A) lies within the above range signifies that the coverage ratio of the toner particle surface by the fatty acid metal salt A relative to the content of the fatty acid metal salt A in the toner is somewhat large. That is, the higher the value of S(A)/X(A), the smaller is the stacking of the fatty acid metal salt A present on the toner particle surface, and is an indicator that the fatty acid metal salt A is adhered planarly. By contrast, the lower the value of S(A)/X(A), below the above lower limit, the greater is the extent to which the fatty acid metal salt A piles up and adheres three-dimensionally onto the surface of the toner.

Therefore, by controlling S(A)/X(A) to lie in the range from 0.248 to 1.000 it becomes possible to increase the coverage ratio of the toner particle surface by the fatty acid metal salt A while causing the fatty acid metal salt A to adhere planarly to the toner particle surface. As a result, migration of the fatty acid metal salt to the developing member can be curtailed, and both development streaks and blotting can be suppressed.

Further, S(A)/X(A) is preferably from 0.250 to 1.000, more preferably from 0.360 to 1.000, yet more preferably from 0.500 to 1.000, still more preferably from 0.600 to 0.960, and particularly preferably from 0.680 to 0.940.

Herein S(A)/X(A) can be controlled on the basis of the external addition conditions of the fatty acid metal salt A. The value of S(A)/X(A) is readily controlled to be 0.248 or higher by performing the external addition of the fatty acid metal salt A to the toner particle by externally adding the fatty acid metal salt A while loosening it (while breaking up secondary particles into primary particles), and thereafter externally adding the fatty acid metal salt A so as to be spread out.

Figure 2:
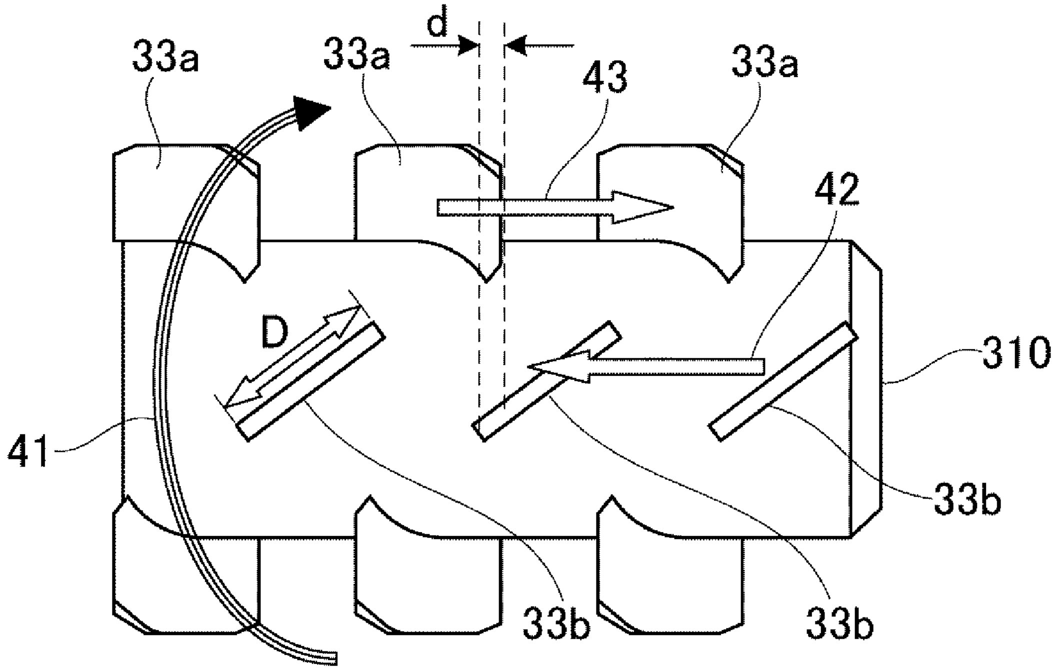
FIG. 2 is a schematic diagram of a stirring member.

More specifically, S(A)/X(A) can be increased through external addition of the fatty acid metal salt using Henschel mixer FM10C (HM) (by Nippon Coke & Engineering Co., Ltd.), followed by further external addition using the apparatus illustrated in FIG. 2. Conversely, S(A)/X(A) can be reduced in a case where external addition is accomplished using only Henschel mixer FM10C (HM) by Nippon Coke & Engineering Co., Ltd.), or by performing external addition using Henschel mixer FM10C (HM) (by Nippon Coke & Engineering Co., Ltd.) after having used the apparatus illustrated in FIG. 2.

Ester Wax

The toner particle comprises a monoester wax. A monoester wax is for instance a compound having one ester bond in the molecule. The monoester wax is preferably at least one compound selected from the group consisting of monoester waxes represented by Formula (4).

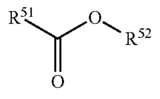

(4)

In Formula (4), $R^{51}$ and $R^{52}$ each independently represent a linear alkyl group having carbon number of 14 to 24 (preferably 16 to 22, more preferably 17 to 22). The $R^{51}$ linear alkyl group has preferably carbon number of 16 to 18. The $R^{52}$ linear alkyl group has preferably carbon number of 20 to 24.

That is, the monoester wax is preferably a condensation product of a fatty acid F1 and an alcohol A1. The fatty acid F1 is preferably a monocarboxylic acid and the alcohol A1 is preferably a fatty acid monoalcohol.

The fatty acid F1 is preferably an aliphatic monocarboxylic acid having carbon number of 16 to 22 (preferably 16 to 20, more preferably 17 to 19). The alcohol A1 is preferably an aliphatic monoalcohol having carbon number of 16 to 24 (preferably 20 to 24, more preferably 20 to 22).

Examples of monoester waxes represented by Formula (4) include palmityl palmitate, stearyl palmitate, behenyl palmitate, palmityl stearate, stearyl stearate, behenyl stearate, palmityl behenate, stearyl behenate and behenyl behenate.

Among the above monoester waxes, stearyl behenate, behenyl behenate and behenyl stearate are preferred as the monoester wax, by virtue of having melting points and molecular weights that lie within the below-described preferred ranges. Behenyl stearate is particularly preferred herein.

The melting point of the monoester wax is preferably from 60° C. to 90° C., more preferably from 65° C. to 85° C., and yet more preferably from 65° C. to 70° C.

The molecular weight of the monoester wax is preferably from 500 to 900, and more preferably from 550 to 850.

The SP value of the monoester wax is preferably from 8.30 to 8.80, and more preferably from 8.45 to 8.65. The units of the SP value are $(cal/cm^3)^{0.5}$.

The content of the monoester wax is preferably from 1.0 parts by mass to 40.0 parts by mass, more preferably from 3.0 parts by mass to 30.0 parts by mass, yet more preferably from 5.0 parts by mass to 25.0 parts by mass, and still more preferably from 15.0 parts by mass to 25.0 parts by mass, relative to 100.0 parts by mass of the binder resin.

Fatty Acid Metal Salt A

The toner comprises the fatty acid metal salt A on the surface of the toner particle.

The fatty acid metal salt A is preferably a salt of a fatty acid F2 and a metal.

Preferably, the fatty acid metal salt A is a salt of the fatty acid F2 and at least one metal selected from the group consisting of zinc, calcium, magnesium, aluminum and lithium. The metal is more preferably at least one metal selected from the group consisting of zinc, aluminum and calcium, yet more preferably at least one metal selected from the group consisting of zinc and aluminum; still more preferably, the metal is zinc. The effect of suppressing development streaks and blotting is more pronounced in a case where these metals are used.

Herein a higher fatty acid having carbon number of 8 to 28 (more preferably 12 to 22, yet more preferably 12 to 18) is preferable as the fatty acid F2 of an aliphatic fatty acid metal salt A. For instance the fatty acid F2 is a straight-chain saturated fatty acid. The metal is preferably a polyvalent metal having a valence of 2 or more.

Specifically, the fatty acid metal salt A is preferably made up of a polyvalent metal having a valence of 2 or more (preferably divalent or trivalent, more preferably divalent metal) and a fatty acid F2 having carbon number of 8 to 28 (more preferably 12 to 22, yet more preferably 12 to 18). The fatty acid F2 has preferably from 16 to 20 carbon number.

Preferably a fatty acid having 8 or more carbon number is used herein, since good charging performance can be achieved in that case.

When the carbon number in the fatty acid F2 is 28 or fewer, the melting point of the fatty acid metal salt A is not excessively high, and fixing performance is less likely to be impaired. Stearic acid is particularly preferred as the fatty acid F2. The polyvalent metal having a valence of 2 or more preferably includes zinc.

The fatty acid metal salt A is exemplified by at least one selected from the group consisting of metal stearates such as zinc stearate, calcium stearate, magnesium stearate, aluminum stearate and lithium stearate, and zinc laurate. The fatty acid metal salt A is more preferably at least one compound selected from the group consisting of zinc stearate and aluminum stearate, and is more preferably zinc stearate.

The content of the fatty acid metal salt A is preferably from 0.06 parts by mass to 0.25 parts by mass, more preferably from 0.08 parts by mass to 0.22 parts by mass, and yet more preferably from 0.10 parts by mass to 0.20 parts by mass, relative to 100 parts by mass of the toner particle. An additional effect is achieved if the addition amount is 0.06 parts by mass or larger. When addition amount is smaller than 0.20 parts by mass, contamination of the developing member is suppressed, and image damage for instance in terms of blotting is unlikelier to occur.

A volume-basis median diameter (D50s) of the fatty acid metal salt A is preferably from 0.1 to 3.0 μm, more preferably from 0.1 to 2.0 μm. By prescribing a value equal to or greater than 0.1 μm, the fatty acid metal salt A spreads on the toner particle surface, without becoming excessively embedded in the toner particle, at the time of external addition. In consequence, the ester wax can be effectively crystallized on the toner particle surface, and as a result development streaks can be further suppressed. By setting the value to be 3.0 μm or smaller, adhesion to the developing member is suppressed, thanks to which and blotting can be further suppressed.

A fixing ratio (%) of the fatty acid metal salt A onto the toner particle is preferably from 20 to 100, more preferably from 25 to 100, yet more preferably from 40 to 75, and still more preferably from 45 to 70. Within the above ranges, member contamination by the fatty acid metal salt A can be suppressed, and blotting can be further forestalled. The fixing ratio of the fatty acid metal salt A can be controlled to lie in a preferred range by controlling mechanical impact forces (stirring peripheral speed and stirring time) in an external addition step of the fatty acid metal salt A (step of mixing the toner particle and the fatty acid metal salt A).

The SP value of the alkyl chain of the fatty acid metal salt is preferably from 8.18 to 8.30, and more preferably from 8.20 to 8.30. The units of the SP value are $(cal/cm^3)^{0.5}$.

Difference in Alkyl Chain Length Between the Ester Wax and the Fatty Acid Metal Salt Preferably, the monoester wax is preferably a condensation product of the fatty acid F1 and the alcohol A1, and the fatty acid metal salt A is a salt of the fatty acid F2 and a metal. At this time, preferably one or more of (a) and (b) below is satisfied.

(a) A difference between a carbon number of the fatty acid F1 and a carbon number of the fatty acid F2 is 2 less.

(b) A difference between a carbon number of the alcohol A1 and a carbon number of the fatty acid F2 is 2 or less.

The difference between the carbon number of the fatty acid F1 and the carbon number of the fatty acid F2 may be 2 or less, and the difference between the carbon number of the alcohol A1 and the carbon number of the fatty acid F2 may be 2 or less.

When the above differences are 2 or less, the crystal nucleating agent effect of the fatty acid metal salt A is brought out more pronouncedly, and development streaks can be yet further suppressed, through promotion of crystallization of the exuded component of the monoester wax having exuded on the toner particle surface during transport. More preferably, the difference between the carbon number of the fatty acid F1 and the carbon number of the fatty acid F2 is 2 or less. The above difference is yet more preferably 1 or less, and is still more preferably 0.

Release Agent

Besides the above monoester wax, the toner particle may contain a known wax as a release agent.

Examples of release agents include petroleum waxes and derivatives thereof typified by paraffin wax, microcrystalline wax and petrolatum; montan wax and derivatives thereof; hydrocarbon waxes produced in accordance with the Fischer-Tropsch process, and derivatives thereof, polyolefin waxes and derivatives thereof, typified by polyethylene; natural waxes typified by carnauba wax and candelilla wax, and derivatives of the foregoing; the above derivatives include oxides, block copolymers with vinylic monomers, and graft-modified products. The foregoing can be used singly or in combination.

Preferably, the toner particle contains a hydrocarbon wax. The content of release agent other than the monoester wax is preferably from 0.1 to 20 parts by mass, and more preferably from 1 to 10 parts by mass, relative to 100 parts by mass of the binder resin.

Inorganic Fine Particle

The toner particle preferably comprises an inorganic fine particle such as a metal fine particle. More preferably, the toner particle comprises a hydrophobized inorganic fine particle. When the toner particle comprises the inorganic fine particle, an external additive can be prevented from becoming embedded in the toner particle upon prolonged printing, and durability can be improved.

Examples of the inorganic fine particle include metal oxides of metals such as Fe, Si, Ti, Sn, Zn, Al and Ce; known types can be used herein. A hydrophobic treatment is accomplished by coating the surface of the inorganic fine particle with a treatment agent having an alkyl group.

The inorganic fine particle is preferably a surface-treated product with a treatment agent having an alkyl group having carbon number of 4 to 20 (preferably 4 to 14, more preferably 6 to 12). For instance the inorganic fine particle is preferably inorganic fine particle having an alkyl group having carbon number of 4 to 20 (preferably 4 to 14, more preferably 6 to 12) on the surface thereof.

The hydrophobic treatment agent is not particularly limited so long as it contains an alkyl group; examples include silane coupling agents, alkyl-modified silicones and titanium coupling agents. The hydrophobic treatment agent is preferably a silane coupling agent. A silane coupling agent will be described below.

Herein 100 parts by mass of the inorganic fine particles are treated using preferably from 4 to 20 parts by mass, and more preferably using from 5 to 15 parts by mass of the treatment agent.

The method for treating the surface of the inorganic fine particle is not particularly limited so long as it is a treatment method in which there is used a surface hydrophobic treatment agent. For instance, the method may be a wet method in which a powder to be treated in a solvent such as water or an organic solvent is treated using a mechanochemical mill such as a ball mill or sand grinder, after which a hydrophobic treatment agent is mixed in, with solvent removal and drying; a dry method in which a powder to be treated and a hydrophobic treatment agent are mixed in a Henschel mixer (by Nippon Coke & Engineering Co., Ltd.) or Super mixer (by Kawata Manufacturing Co., Ltd.), followed by drying; or a method in which a powder to be treated and a surface hydrophobic treatment agent are brought into contact with each other, in high-speed airflow such as that in a Counter jet mill (by Hosokawa Micron Corporation), to thereby treat the powder.

More preferably, the hydrophobized inorganic fine particle is a magnetic body.

Examples of the magnetic body include magnetic iron oxides such as magnetite, maghemite and ferrite; magnetic iron oxides including other metal oxides; metals such as Fe, Co and Ni, or alloys of these metals and Al, Co, Cu, Pb, Mg, Ni, Sn, Zn, Sb, Be, Bi, Cd, Ca, Mn, Se, Ti, W or V, as well as mixtures of the foregoing.

Magnetite is preferred among these magnetic bodies; examples of the shape of magnetite include polyhedral, octahedral, hexahedral, spherical, needle-like and scale-like shapes; among the foregoing, for instance hexahedral or spherical magnetite, since this entails inhibition of aggregation and accordingly higher image density.

The number-average particle diameter of the primary particles of the magnetic body is preferably from 50 nm to 500 nm, more preferably from 100 nm to 300 nm, and yet more preferably from 150 nm to 250 nm.

The content of the magnetic body is preferably from 35 parts by mass to 100 parts by mass, and more preferably from 45 parts by mass to 95 parts by mass, relative to 100 parts by mass of the binder resin.

The content of the magnetic body in the toner can be measured using a thermal analyzer TGA Q5000IR by PerkinElmer Inc. The measurement method involves heating the toner up from room temperature to 900° C. at a ramp rate of 25° C./min, in a nitrogen atmosphere, whereupon the loss mass from 100° C. to 750° C. is taken as the mass of components in the toner excluding the magnetic body, and the residual mass is taken as the amount of the magnetic body.

Examples of the method for producing the magnetic body include the following method.

To an aqueous solution of a ferrous salt there is added an alkali such as sodium hydroxide, in an amount of one equivalent or more with respect to one equivalent of the iron component, to thereby prepare an aqueous solution containing ferrous hydroxide. Air is then blown into the prepared aqueous solution while the pH of the solution is kept at 7 or higher, whereupon an oxidation reaction of the ferrous hydroxide is conducted, while under warming of the aqueous solution at 70° C. or above, to thereby initially form seed crystals that constitute the cores of the magnetic bodies.

An aqueous solution containing 1 equivalent of ferrous sulfate, referred to the amount of the previously added alkali, is added to a slurry-like solution containing the seed crystals. The reaction of ferrous hydroxide is allowed to proceed while the pH of the solution is maintained at 5 to 10 and while air is blown in, to thereby grow magnetic iron oxide particles using the seed crystals as cores. The shape and magnetic characteristics of the magnetic body can be controlled through adjustment of the pH, the reaction temperature, and stirring conditions. The pH of the solution becomes increasingly acidic as the oxidation reaction proceeds, but preferably the pH of the solution should not be lower than 5. A magnetic body can then be obtained by filtering, washing and drying the magnetic iron oxide particles thus obtained.

The hydrophobic treatment of the magnetic body is not particularly limited, but preferably there is used a hydrophobic treatment agent having a comparatively large number of carbon atoms, represented by Formula (I) below. Preferably, the magnetic body is subjected to a surface treatment using the below-described treatment apparatus.

As a result, the hydrophobic treatment agent can be caused to react uniformly with the surface of the magnetic body particles body, to thereby bring out high hydrophobicity.

The magnetic body is preferably a magnetic body having been hydrophobized using a hydrophobic treatment agent in the form of an alkyltrialkoxysilane coupling agent represented by Formula (I) below. That is, the magnetic body is preferably surface-treated with the hydrophobic treatment agent represented by Formula (I) below.

$$C_pH_{2p+1}—Si—(OC_qH_{2q+1})_3 \quad (I)$$

In Formula (I), p represents an integer from 4 to 12 (preferably from 6 to 12) and q represents an integer from 1 to 3 (preferably from 1 or 2).

Preferably, p in Formula (I) is 4 or greater, since in that case sufficient hydrophobicity can be imparted to the magnetic body, and p is 12 or smaller, since in that case the surface of the magnetic body can be uniformly treated, and magnetic body coalescence can be suppressed. Examples include n-butyltrimethoxysilane, n-hexyltrimethoxysilane, n-octyltrimethoxysilane and n-decyltrimethoxysilane.

Further, when p is 4 or larger, affinity between the treatment agent and the monoester wax increases, and the crystal nucleating agent effect of promoting crystallization of the monoester wax after the fixing step is elicited yet more readily. As a result, the melted monoester wax can be crystallized instantly, after continuous image output, and it becomes possible to suppress ejected paper adhesion (ejected print sticking) in which ejected paper prints adhere to each other on a paper ejection tray.

The SP value of the alkyl chain in the hydrophobic treatment agent is preferably from 7.50 to 8.50, and more preferably from 7.80 to 8.20. The units of the SP value are $(cal/cm^3)^{0.5}$.

The hydrophobic treatment method is not particularly limited, but the method below is preferred.

For the purpose of eliciting a uniform reaction of the hydrophobic treatment agent on the particle surface of the magnetic body and thereby bring out high hydrophobicity, while at the same time partially leaving hydroxyl groups on the particle surface of the magnetic body, without complete hydrophobization of the hydroxyl groups, it is preferable that the hydrophobic treatment be performed in accordance with a dry method using a wheel-type kneader or a grinder.

Herein, Mix-Muller (by SINTOKOGIO, LTD), Erich mill (by Nippon Eirich Co., Ltd.) or the like can be used as the wheel-type kneader; although Mix-Muller (by SINTOKOGIO, LTD) is preferably used.

Three actions of compression, shearing and spatula action can be brought out in a case where a wheel-type kneader or a grinder is used.

The hydrophobic treatment agent present between the particles of the magnetic body is pressed against the surface of the magnetic body on account of the compression action, so that adhesiveness and reactivity with the particle surface can be enhanced. Through application of shear forces to the hydrophobic treatment agent and to the magnetic body, brought about by the shearing action, the hydrophobic treatment agent can be stretched and the particles of the magnetic body can be broken up, to release aggregates. Further, the spatula action allows the hydrophobic treatment agent present on the surface of the magnetic body to be evenly spread, as if through the use of a spatula.

Through continuous and repeated eliciting of the above three actions, the surfaces of the magnetic body particles can become uniformly treated while aggregates of the magnetic body particles are broken up and separated into individual particles, without re-aggregation.

Ordinarily, the hydrophobic treatment agent represented by Formula (I) having a comparatively large number of carbon atoms tends to make it difficult to uniformly treat the particle surface of the magnetic body at the molecular level, since the molecule of the hydrophobic treatment agent is large and highly bulky; a treatment in accordance with the above method is however preferable, since the treatment can be performed stably.

In a case where toner is produced in accordance with the below-described suspension polymerization method, the inorganic fine particle (magnetic body) having been thus hydrophobized acts as a surfactant due to the effect of the hydrophobicity derived from the alkyl substituent in the toner formation process, and the effect of the hydrophilicity of the residual hydroxyl groups. As a result, the magnetic body is present unevenly in a vicinity of the surface of the toner particle. That is, the inorganic fine particle (preferably a magnetic body) is preferably distributed unevenly in the vicinity of the surface of the toner particle. For instance a shell containing the inorganic fine particle is preferably present in the vicinity of the surface of the toner particle. The toner particle is preferably a suspension-polymerized toner particle.

By virtue of presence of the magnetic body in the vicinity of the surface, embedding of the fatty acid metal salt A into the toner particle over long-term use is suppressed, and the crystal nucleating agent effect of the fatty acid metal salt A on the monoester wax is readily brought out over long-term use (second print-count half).

Colorant

The toner particle may contain a colorant. The toner particle may further contain a colorant, in addition to the above-described magnetic body. As the colorant there can be used known pigments and dyes, of black, yellow, magenta, cyan colors, and of other colors, without particular limitations.

Black colorants include black pigments such as carbon black.

Yellow colorants include yellow pigments and yellow dyes such as monoazo compounds; disazo compounds; condensed azo compounds; isoindolinone compounds; benzimidazolone compounds; anthraquinone compounds; azo metal complexes; methine compounds; and allylamide compounds.

Concrete examples include C. I. Pigment Yellow 74, 93, 95, 109, 111, 128, 155, 174, 180 and 185, and C. I. Solvent Yellow 162.

Magenta colorants include magenta pigments and magenta dyes such as monoazo compounds; condensed azo compounds; diketopyrrolopyrrole compounds; anthraquinone compounds; quinacridone compounds; basic dye lake compounds; naphthol compounds; benzimidazolone compounds; thioindigo compounds and perylene compounds.

Specifically, C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254 and 269, and C. I. Pigment Violet 19.

Examples of cyan colorants include cyan pigments and cyan dyes such as copper phthalocyanine compounds and derivatives thereof, anthraquinone compounds; and basic dye lake compounds.

Concrete examples include C. I. Pigment Blue 1, 7, 15, 15:1, 15:2, 15:3, 15:4, 60, 62 and 66.

The content of the colorant is preferably from 1.0 part by mass to 20.0 parts by mass relative to 100.0 parts by mass of the binder resin.

Charge Control Agent

The toner particle may contain a charge control agent. A known charge control agent can be used herein. Particularly preferably, the charge control agent delivers high charging speed and is capable of stably maintaining a constant charge quantity.

Examples of charge control agents that control toner so as to exhibit negative chargeability include the following.

Organometallic compounds and chelate compounds in the form of monoazo metal compounds, acetylacetone metal compounds, as well as metal compounds of aromatic oxycarboxylic acids, aromatic dicarboxylic acids, oxycarboxylic acid and dicarboxylic acids. Other examples include aromatic oxycarboxylic acids, aromatic mono- and polycarboxylic acids and metal salts, anhydrides or esters thereof, as well as phenol derivatives such as bisphenols.

Further examples include urea derivatives, metal-containing salicylic acid-based compounds, metal-containing naphthoic acid-based compounds, boron compounds, quaternary ammonium salts and calixarenes.

Examples of the charge control agents that control toner as so to exhibit positive chargeability include the following. Nigrosin and modified products thereof with a fatty acid metal salt; guanidine compounds; imidazole compounds; onium salts such as quaternary ammonium salts, for instance tributylbenzylammonium 1-hydroxy-4-naphtholsulfonate salt and tetrabutylammonium tetrafluoroborate, and phosphonium salts that are analogues of the foregoing, as well as lake pigments of the foregoing; plus triphenylmethane dyes and lake pigments thereof (examples of laking agents include phosphotungstic acid, phosphomolybdic acid, phosphotungstomolybdic acid, tannic acid, lauric acid, gallic acid, ferricyanide compounds and ferrocyanide compounds); and also metal salts of higher fatty acids, and resin-based charge control agents.

The charge control agent can be incorporated singly or in combinations of two or more types. The addition amount of these charge control agents is preferably from 0.01 parts by mass to 10.00 parts by mass relative to 100.00 parts by mass of polymerizable monomers.

External Additive

The toner may contain an external additive.

As the external additive there can be used a known external additive, without particular limitations.

Examples of external additives include bulk silica fine particles such as wet-process silica and dry-process silica, and surface-treated silica fine particles resulting from surface-treating the bulk silica fine particles with a treatment agent such as a silane coupling agent, a titanium coupling agent or a silicone oil; metal oxide fine particles typified by titanium oxide fine particles, aluminum oxide fine particles, zinc oxide fine particles, tin oxide fine particles and the like, or metal oxide fine particles obtained by subjecting the metal oxides to a hydrophobic treatment; metal complexes of aromatic carboxylic acids typified by salicylic acids, alkylsalicylic acids, dialkylsalicylic acids, naphthoic acid and dicarboxylic acids; clay minerals typified by hydrotalcite; fluorine-based resin fine particles such as vinylidene fluoride fine particles and polytetrafluoroethylene fine particles; inorganic fine particles such as calcium carbonate, calcium phosphate and cerium oxide; as well as organic fine particles such as polymethyl methacrylate resins, silicone resins and melamine resins.

From the viewpoint of flowability and charging stability, there are preferably used silica fine particles obtained by through a hydrophobic treatment of bulk silica fine particles with silicone oil or the like.

The content of the external additive in the toner is preferably from 0.1 parts by mass to 5.0 parts by mass relative to 100 parts by mass of the toner particle.

Production Method

A method for producing the toner will be explained next, but the method is not limited thereto.

Methods for producing toner include pulverization methods and polymerization methods, for instance dispersion polymerization, association aggregation, dissolution suspension, suspension polymerization and emulsification aggregation methods. Suspension polymerization is a more preferable method, since it allows obtaining a toner satisfying suitable physical properties, by causing a magnetic body to be readily present in the vicinity of the surface of the toner particle.

In a suspension polymerization method, for instance polymerizable monomers capable of forming a binder resin, a monoester wax and, as needed, a magnetic body, a release agent, a polymerization initiator, a crosslinking agent, a charge control agent and other additives, are uniformly dispersed, to yield a polymerizable monomer composition. Thereafter, the obtained polymerizable monomer composition is dispersed and granulated, using a suitable stirrer, in a continuous layer (for instance an aqueous phase) that contains a dispersion stabilizer, and a polymerization reaction is conducted using a polymerization initiator, to yield a toner particle having a desired particle diameter.

The toner obtained in accordance with this suspension polymerization method will be hereafter also referred to as "polymerized toner".

Examples of polymerizable monomers include the following.

Styrenic monomers such as styrene, o-methylstyrene, m-methylstyrene, p-methylstyrene, p-methoxystyrene and p-ethylstyrene.

acrylic esters such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, 2-chloroethyl acrylate and phenyl acrylate;

methacrylic acid esters such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate.

Other monomers include acrylonitrile, methacrylonitrile and acrylamide. These monomers can be used singly or as mixtures thereof.

Among the foregoing monomers there are preferably used styrenic monomers, singly or mixed with other monomers such as acrylic acid esters and methacrylic acid esters, since that way the toner structure can be controlled and the developing characteristics and durability of the toner can be readily improved. In particular, the monomers that are used have a main component in the form of styrene and an alkyl acrylate ester, or styrene and an alkyl methacrylate ester. The carbon number of the alkyl group of the alkyl ester is preferably from 1 to 8, and more preferably from 2 to 6. That is, the binder resin preferably contains 50 mass % or more, more preferably from 80 to 100 mass %, and yet more preferably from 90 to 100 mass %, of a styrene acrylic resin.

A polymerization initiator having a half-life from 0.5 hours to 30 hours at the time of the polymerization reaction is preferably used as the polymerization initiator that is utilized in the production of toner particle by a polymerization method. Preferably, the polymerization initiator is used in an amount of 0.5 parts by mass to 20 parts by mass relative to 100 parts by mass of the polymerizable monomers. In that case, a polymer having a maximum molecular weight between 5,000 and 50,000 can be obtained, and the toner can be imparted with preferable strength and appropriate melting characteristics.

Concrete examples of polymerization initiators include azo-based and diazo-based polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile and azobisisobutyronitrile; and peroxide-based polymerization initiators such as benzoyl peroxide, methyl ethyl ketone peroxide, diisopropyl peroxycarbonate, cumene hydroperoxide, 2,4-dichlorobenzoyl peroxide, lauroyl peroxide, t-butyl peroxy-2-ethylhexanoate, t-butyl peroxypivalate, di(2-ethylhexyl) peroxydicarbonate and di(sec-butyl)peroxydicarbonate.

Preferred among the foregoing is t-butyl peroxypivalate.

A cross-linking agent may be added in a case where the toner is produced in accordance with a polymerization method. A known cross-linking agent such as divinylbenzene can be used herein.

The addition amount of the crosslinking agent is preferably from 0.05 parts by mass to 15.00 parts by mass, more preferably from 0.10 parts by mass to 10.00 parts by mass, yet more preferably from 0.20 parts by mass to 5.00 parts by mass, and still more preferably from 0.25 parts by mass to 0.60 parts by mass, relative to 100.00 parts by mass of the polymerizable monomers.

The polymerizable monomer composition may contain a polar resin.

Examples of polar resins include homopolymers of styrene and substituted products thereof, such as polystyrene and polyvinyltoluene; styrenic copolymers such as styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-dimethylaminoethyl acrylate copolymers, styrene-methyl methacrylate copolymers, styrene-ethyl methacrylate copolymers, styrene-butyl methacrylate copolymers, styrene-dimethylaminoethyl methacrylate copolymers, styrene-vinyl methyl ether copolymers, styrene-vinyl ethyl ether copolymers, styrene-vinyl methyl ketone copolymers, styrene-butadiene copolymers, styrene-isoprene copolymers, styrene-maleic acid copolymers and styrene-maleate ester copolymers; as well as polymethyl methacrylate, polybutyl methacrylate, polyvinyl acetate, polyethylene, polypropylene, polyvinyl butyral, silicone resins, polyester resins, styrene-polyester copolymers, polyacrylate-polyester copolymers, polymethacrylate-polyester copolymers, polyamide resins, epoxy resins, polyacrylic acid resins, terpene resins and phenolic resins.

The foregoing can be used singly or in mixtures of two or more types. Functional groups such as amino groups, carboxyl groups, hydroxyl groups, sulfonic acid groups, glycidyl groups and nitrile groups may be introduced into such polymers. Polyester resins are preferred among these resins.

A saturated polyester resin, an unsaturated polyester resin, or both, can be selected as appropriate and used as the polyester resin.

Ordinary polyester resins made up of an alcohol component and an acid component can be used; examples of these two components are set out below.

Examples of dihydric alcohol components include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, cyclohexanedimethanol, butenediol, octenediol, cyclohexenedimethanol, hydrogenated bisphenol A, bisphenol derivatives represented by Formula (A) below; hydrogenated products of the bisphenol derivative represented by Formula (A) below, diols represented by Formula (B) below, and hydrogenated products of the diol represented by Formula (B).

(A)

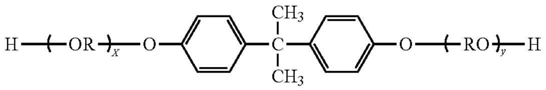

In Formula (A) above, R represents an ethylene group or a propylene group; and x and y are each independently an integer equal to or greater than 1, such that the average value of x+y is from 2 to 10.

(B)

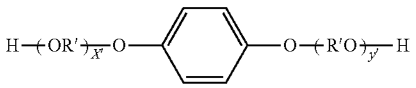

(In the formula, R' is

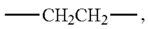, 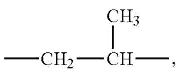, or

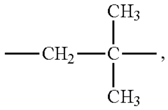, and x' and y' are each an integer equal to or greater than 0, such that the average value of x'+y' is from 0 to 10.)

As the dihydric alcohol component, the above alkylene oxide adducts of bisphenol A are particularly preferable because these are excellent in charging characteristics and environmental stability, and are well-balanced in other electrophotographic properties.

In the case of an alkylene oxide adduct of bisphenol A, the average number of added moles of alkylene oxide is preferably from 2 to 10, from the viewpoint of fixing performance and toner durability.

Examples of divalent acid components include: benzenedicarboxylic acids and anhydrides thereof, such as phthalic acid, terephthalic acid, isophthalic acid and phthalic anhydride; alkyldicarboxylic acids and anhydrides thereof, such as succinic acid, adipic acid, sebacic acid and azelaic acid; succinic acid substituted with a C6 to C18 alkyl or alkenyl group, as well as anhydrides thereof, and unsaturated dicarboxylic acids and anhydrides thereof, such as fumaric acid, maleic acid, citraconic acid and itaconic acid.

Examples of trihydric or higher alcohol components include glycerin, pentaerythritol, sorbitol, sorbitan and oxyalkylene ethers of novolac phenolic resins.

Examples of trivalent or higher acid components include trimellitic acid, pyromellitic acid, 1,2,3,4-butanetetracarboxylic acid, benzophenonetetracarboxylic acid, as well as anhydrides thereof.

Preferably, from 45 mol % to 55 mol % of the polyester resin is an alcohol component, with respect to a total of 100 mol % of the alcohol component plus the acid component.

The polyester resin can be produced using for instance a catalyst such as a tin-based catalyst, an antimony-based catalyst or a titanium-based catalyst, but preferably using a titanium-based catalyst.

The number-average molecular weight of the polar resin is from 2500 to 25000, from the viewpoint of developing performance, blocking resistance and durability.

The acid value of the polar resin is preferably from 1.0 mgKOH/g to 15.0 mgKOH/g, and more preferably from 2.0 mgKOH/g to 10.0 mgKOH/g.

The content of the polar resin is preferably from 2 parts by mass to 20 parts by mass, relative to 100 parts by mass of the binder resin.

The aqueous medium in which the polymerizable monomer composition is dispersed may contain a dispersion stabilizer.

Known surfactants, organic dispersing agents and inorganic dispersing agents can be used as the dispersion stabilizer.

Among the foregoing, inorganic dispersing agents can be preferably used since these agents afford dispersion stability on account of their steric hindrance, and hence stability is not readily lost, and the toner is not adversely affected, upon modification of the reaction temperature.

Concrete examples of inorganic dispersing agents include inorganic compounds, for instance phosphoric acid polyvalent metal salts such as tricalcium phosphate, magnesium phosphate, aluminum phosphate, zinc phosphate and hydroxyapatite; carbonates such as calcium carbonate and magnesium carbonate; inorganic salts such as calcium metasilicate, calcium sulfate and barium sulfate; as well as calcium hydroxide, magnesium hydroxide and aluminum hydroxide.

The addition amount of the inorganic dispersing agent is preferably from 0.2 parts by mass to 20 parts by mass relative to 100 parts by mass of the polymerizable monomers. The dispersion stabilizer may be used singly, or a plurality of types thereof may be used concomitantly. A surfactant may be used concomitantly in an amount from 0.001 parts by mass to 0.1 parts by mass.

In a case where an inorganic dispersing agent is used, the agent may be used as-is, but may also be used, for the purpose of obtaining yet finer particles, in the form of fine particles of the inorganic dispersing agent generated in an aqueous medium.

In the case for instance of tricalcium phosphate, an aqueous solution of sodium phosphate and an aqueous solution of calcium chloride can be mixed, under high-speed stirring, to generate fine particles of water-insoluble calcium phosphate, and enable thereby a more uniform and finer dispersion.

Examples of the surfactant include sodium dodecylbenzenesulfate, sodium tetradecylsulfate, sodium pentadecylsulfate, sodium octylsulfate, sodium oleate, sodium laurate, sodium stearate and potassium stearate.

In the step of polymerizing the polymerizable monomers, the polymerization temperature is ordinarily 40° C. or higher, and may be set preferably to lie in the range from 50° C. to 90° C.

This is followed by a cooling step of cooling from the reaction temperature of about 50° C. to 90° C., to terminate thereby the polymerization reaction step. Cooling may be performed herein so as to preserve a compatible state between the release agent and the binder resin.

Once the polymerization reaction is over, a step may be thereafter performed of heating the dispersion containing polymerized particles up to from 95 to 120° C., and holding that temperature for 1 to 5 hours. Preferably, a cooling step is carried out thereafter.

In the cooling step, cooling is preferably performed at a rate of 50 to 300° C./min (preferably 100 to 300° C./min, and more preferably 150 to 250° C./min). As a result of this step, a crystalline material contained in the binder resin can be dispersed, in a fine shape, within the toner particle. Cooling may be performed for instance down to about 20 to 50° C.

Thereafter, an annealing step may be further performed of holding at 40 to 65° C. (preferably at 40 to 60° C.) for 1 to 10 hours (preferably for 2 to 5 hours). This step allows improving the degree of crystallinity of the crystalline material contained in the binder resin.

Thereafter, the obtained polymer particles are filtered, washed and dried in accordance with a known method, to yield a toner particle. A toner can then be obtained by mixing the external additive into the toner particle, to elicit adhesion of the external additive to the surface of the toner particle. Further, the production process may include a classification step, for cutting of a coarse powder or of a fine powder of the toner particle.

A volume-average particle diameter (Dv) of the toner is preferably from 5.0 μm to 10.0 μm, more preferably from 6.0 μm to 9.0 μm. Developing performance can be sufficiently satisfied by setting the volume-average particle diameter (Dv) of the toner to lie in the above range.

A ratio (Dv/D1) of the volume-average particle diameter (Dv) relative to a number-average particle diameter (D1) of the toner is preferably 1.25 or lower, and is more preferably lower than 1.25. The values of Dv and Dv/D1 of the toner can be controlled for instance on the basis of the amount of the dispersing agent, and the type and revolutions of the stirrer.

The weight-average molecular weight (Mw) of the binder resin is preferably from 10,000 to 300,000, more preferably from 15,000 to 260,000, and yet more preferably from 20,000 to 230,000. Low-temperature fixability tends to improve when the weight-average molecular weight of the binder resin is 300,000 or lower. Heat-resistant storability tends to improve when the weight-average molecular weight of the binder resin is 10,000 or higher The molecular weight distribution (weight-average molecular weight Mw/number-average molecular weight Mn) of the binder resin is preferably from 2 to 40, more preferably from 3 to 35, and yet more preferably from 3 to 23. Low-temperature fixability and storability tend to improve when the molecular weight distribution is 40 or less. Hot offset resistance tends to improve when the molecular weight distribution is 2 or more.

External Addition Method

Preferably the method comprises a treatment step of treating a mixture comprising the toner particle and the fatty acid metal salt A.

The treatment apparatus that is used in the treatment step comprises:

- a stirring member having a rotating member and a plurality of stirring blades provided on a surface of the rotating member;
- a container having a cylindrical inner peripheral surface and accommodating the stirring member; and
- a drive member for applying a rotational driving force to the rotating member and thereby cause the stirring member to rotate within the container,
- the plurality of the stirring blades are provided so that a gap is left with the inner peripheral surface of the container; and
- the stirring blades preferably have a first stirring blade for, as a result of a rotation of the stirring member, feeding the mixture, having been charged into the container, towards one side in an axial direction of the rotating member, and a second stirring blade for feeding the mixture towards the other side in the axial direction.

A known mixing process apparatus can be used as a mixing process apparatus for externally adding and mixing the fatty acid metal salt A and silica fine particles; preferred herein is an apparatus such as that illustrated in FIG. 1, from the viewpoint of controlling the coating state of the fatty acid metal salt A.

FIG. 1 is a schematic diagram illustrating an example of a mixing process apparatus that can be used at the time of external addition and mixing of an external additive such as the fatty acid metal salt A.

The mixing process apparatus is configured to apply shear to a toner particle and an external additive such as the fatty acid metal salt A, at a narrow clearance portion, so that as a result the external additive can adhere to the surface of the toner particle while being broken up from secondary particles to primary particles, and the external additive can be caused to adhere to the surface of the toner particle, with the fatty acid metal salt A in a spread-out state.

Meanwhile, FIG. 2 is a schematic diagram illustrating an example of the configuration of a stirring member used in the mixing process apparatus.

An external addition/mixing step of the external additive will be explained next with reference to FIG. 1 and FIG. 2.

The mixing process apparatus for external addition/mixing of the external additive includes a stirring member having a plurality of stirring blades 33 installed on the surface of a rotating member 32; a drive member 38 which rotationally drives the rotating member; and a body casing 31 provided so as to leave a gap with the stirring blades 33.

Shear is applied uniformly to the toner particle at the gap (clearance) between the inner periphery of the body casing 31 and the stirring blades 33, so that the external additive can be caused to adhere to surface of the toner particle while being broken up from secondary particles into primary particles.

The diameter of the inner periphery of the body casing 31 in the present apparatus is twice or less the diameter of the outer periphery of the rotating member 32. FIG. 1 illustrates an example in which the diameter of the inner periphery of the body casing 31 is 1.7 times the diameter of the outer periphery of the rotating member 32 (diameter of the body (rotating member 32)) excluding the stirring blades 33 from the stirring member). When the diameter of the inner periphery of the body casing 31 is twice or less the diameter of the outer periphery of the rotating member 32, a treatment space where forces act on the toner particle is moderately restricted and, as a result, impact forces can be sufficiently exerted on the external additive that makes up secondary particles.

Preferably, the above clearance is adjusted in accordance with the size of the body casing. The size of the clearance is suitably from 1% to 5% of the diameter of the inner periphery of the body casing 31, since in that case shear is efficiently imparted to the external additive. Specifically, in a case where the diameter of the inner periphery of the body casing 31 is about 130 mm, the clearance may be set to from about 2 mm to 9 mm, while in a case where the inner periphery of the body casing 31 is about 800 mm, the clearance may be set to from about 10 mm to 30 mm.

The external addition/mixing step of the external additive involves externally adding and mixing an external additive, using the mixing process apparatus, onto the surface of the toner particle, through stirring and mixing of the toner particle and the external additive having been charged into the mixing process apparatus, by causing the rotating member 32 to rotate by way of the drive member 38.

As illustrated in FIG. 2, at least some of the plurality of stirring blades 33 are formed as feeding stirring blades 33*a* for feeding the toner particle and the external additive towards one side in the axial direction of the rotating member, accompanying rotation of the rotating member 32. Moreover, at least some of the plurality of stirring blades 33 are formed as return stirring blades 33*b* for returning the toner particle and the external additive towards the other side in the axial direction of the rotating member, accompanying rotation of the rotating member 32.

In a case where a starting material inlet 35 and a product outlet 36 are provided at respective ends of the body casing 31, as illustrated in FIG. 1, the direction from the starting material inlet 35 towards the product outlet 36 (rightward direction in FIG. 1) is referred to as "feed direction".

Specifically, the plate surface of the feeding stirring blades 33*a* is tilted so as to feed the toner particle in a feed direction 43, as illustrated in FIG. 2. By contrast, the plate surface of the stirring blades 33*b* is tilted so as to feed the toner particle and the external additive in a return direction 42. The stirring blades 33*a* and the stirring blades 33*b* exhibit a relationship of first stirring blades and second stirring blades.

The external addition/mixing treatment of the external additive on the surface of the toner particle is performed thereby while under repeated feeding in the "feed direction" 43 and feeding in the "return direction" 42. The stirring blades 33*a* and 33*b* make up a set of a plurality of members disposed spaced apart from each other in the circumferential direction of the rotating member 32. In the example illustrated in FIG. 2, the stirring blades 33*a*, 33*b* form respective sets of two members that are spaced by 180 degrees from each other, on the rotating member 32, but may form sets of multiple members, for instance sets of three members spaced from each other by 120 degrees, or sets of four members spaced from each other by 90 degrees.

In the example of the stirring members illustrated in FIG. 2, there are formed a total of 12 equally spaced stirring blades 33*a* and 33*b*.

In FIG. 2, the reference symbol D represents the width of each stirring member, and d represents a distance denoting the overlap between the stirring members. Herein, D is preferably from about 20% to 30% of the length of the rotating member 32 in FIG. 2, from the viewpoint of efficiently feeding the toner particle and external additive in the feed direction and in the return direction. FIG. 2 illustrates an example in which D is 23% of the length of the rotating member 32. Preferably, a certain overlap portion d between respective stirring blades 33*b* and stirring blades 33*a* exists when drawing extension lines from the end positions of the stirring blades 33*a* in the vertical direction.

As a result, the external additive can be efficiently dispersed on the surface of the toner particle. Preferably, a ratio of d with respect to D is from 10% to 30%, from the viewpoint of applying appropriate shear.

Other than a shape such as that illustrated in FIG. 2, the blades may take on a shape such that the toner particle can be fed in the feed direction and the return direction; so long as a clearance can be maintained, the shape of the blades may be for instance a curved surface shape, or a paddle structure shape in which a tip blade portion is joined to the rotating member 32 by way of a rod-like arm.

A detailed description follows next with reference to the schematic diagrams of the apparatus illustrated in FIG. 1 and FIG. 2. The apparatus illustrated in FIG. 1 includes a rotating member 32 having at least a plurality of stirring blades 33 installed on the surface thereof, a drive member 38 for rotationally driving the rotating member 32, and a body casing 31 provided so as to leave a gap with the stirring blades 33. The apparatus further has a jacket 34 inward of the body casing 31 and adjacent to a rotating member end side face 310, such that a cooling/heating medium can flow through the jacket 34.

The apparatus illustrated in FIG. 1 further has a starting material inlet 35 formed at the top of the body casing 31 and a product outlet 36 formed at the bottom of the body casing 31. The starting material inlet 35 is used in order to introduce the toner particle and the external additive, and the product outlet 36 is used in order to discharge toner resulting from an external addition/mixing treatment, to the exterior of the body casing 31.

In the mixing process apparatus illustrated in FIG. 1, a starting material inlet inner piece 316 is inserted in the starting material inlet 35, and a product outlet inner piece 317 is inserted in the product outlet 36.

Firstly the starting material inlet inner piece 316 is removed from the starting material inlet 35, and the toner particle is charged into the treatment space 39 from the starting material inlet 35. The external additive is charged into the treatment space 39 through the starting material inlet 35, and the starting material inlet inner piece 316 is inserted. Next, the rotating member 32 is then caused to rotate by the drive member 38 (the reference symbol 41 denotes the rotation direction), to perform an external addition/mixing treatment of the inputted treatment product, while under stirring and mixing by the plurality of stirring blades 33 provided on the surface of the rotating member 32.

As regards of the order of charging, the external additive may be charged through the starting material inlet 35 first, followed by charging of the toner particle through the starting material inlet 35. Preferably, the toner particle and the external additive are mixed beforehand using a mixer such as a Henschel mixer, followed by charging of the resulting mixture through the starting material inlet 35 of the apparatus illustrated in FIG. 1.

The treatment time over which the external addition machine illustrated in FIG. 1 is utilized is not particularly limited, but is preferably from 1 minute to 10 minutes, more preferably from 2 minutes to 6 minutes, and yet more preferably from 3 minutes to 5 minutes. In a case where the treatment time is shorter than 1 minute, the fatty acid metal salt A does not become sufficiently spread on the toner particle surface, and S(A)/X(A) tends to be low.

The revolutions of the stirring member at the time of external addition/mixing is not particularly limited. In an apparatus where the volume of the treatment space 39 of the apparatus illustrated in FIG. 1 is $2.0\times10^{-3}$ $m^3$, the revolutions of the stirring blades 33 having the shape of FIG. 2 is preferably from 500 rpm to 2000 rpm, and more preferably from 800 rpm to 1500 rpm. A specific coating state of the fatty acid metal salt A can be attained readily by adopting such ranges.

Preferably, three-stage mixing is carried out in which after the toner particle and silica fine particles have been mixed once (first stage), the fatty acid metal salt A is added and mixed (second stage), followed by mixing (third stage) using the apparatus illustrated in FIG. 1. Mixing in the first stage and in the second stage is preferably carried out using a known mixing apparatus such as a Henschel mixer.

Once the external addition/mixing treatment is over, the product outlet inner piece 317 is taken out from within the product outlet 36, and the rotating member 32 is caused to rotate by the drive member 38, to discharge the toner through the product outlet 36. As the case may require, for instance coarse particles are separated from the toner thus obtained using a sieving machine such as a circular vibrating sieving machine, to yield a toner.

An image-forming method will be explained next.

The image-forming method comprises:

a charging step of charging a surface of an electrostatic latent image bearing member;

an electrostatic latent image formation step of forming an electrostatic latent image on a surface of the charged electrostatic latent image bearing member;

a developing step of developing the electrostatic latent image, with toner, to form a toner image on the surface of the electrostatic latent image bearing member;

a transfer step of transferring the toner image from the electrostatic latent image bearing member to a transfer material via, or not via, an intermediate transfer member; and a fixing step of fixing the toner image transferred on the transfer material, through action of heat and pressure.

The developing step is preferably a developing step according to a mono-component contact development system.

Mono-Component Contact Development System

A mono-component contact development system will be explained next.

Figure 3:
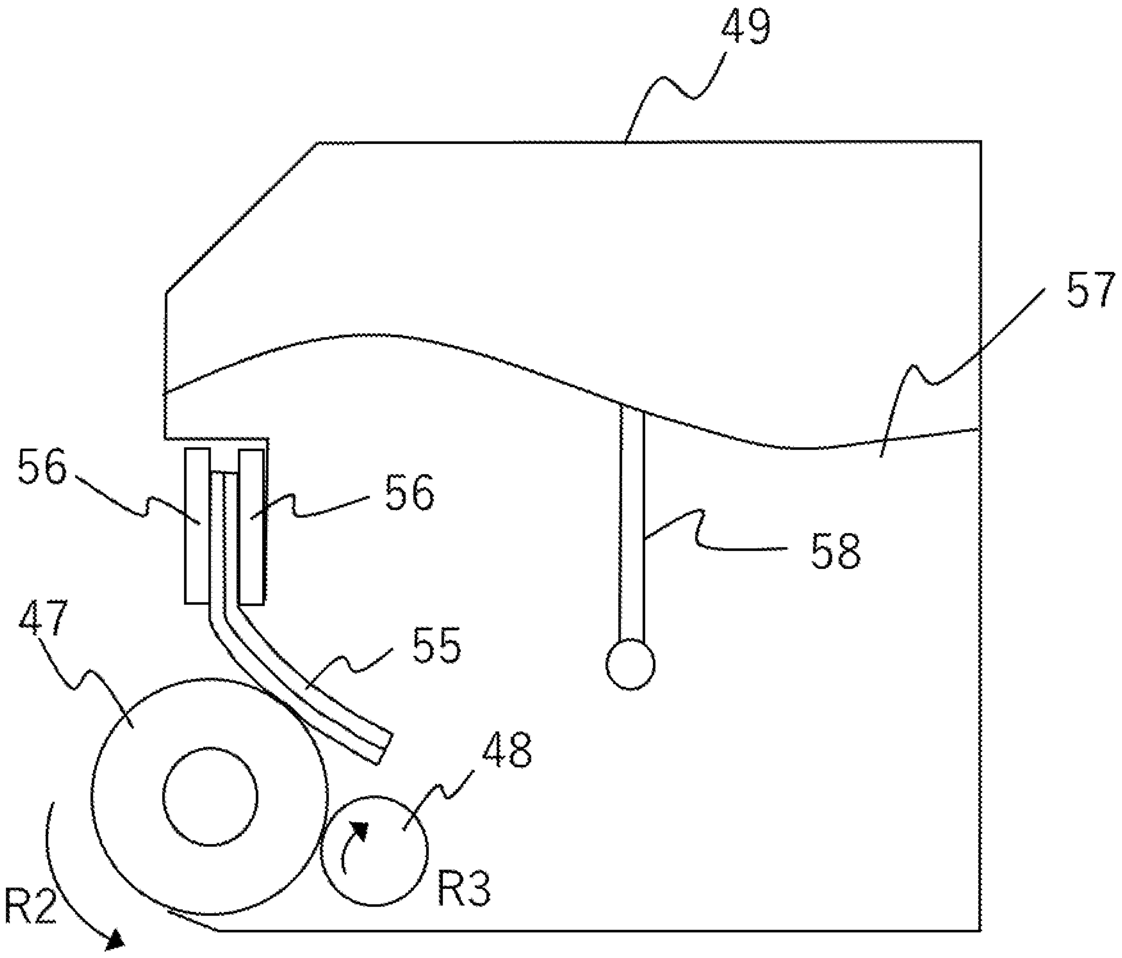
FIG. 3 is an example of a developing apparatus.
Figure 4:
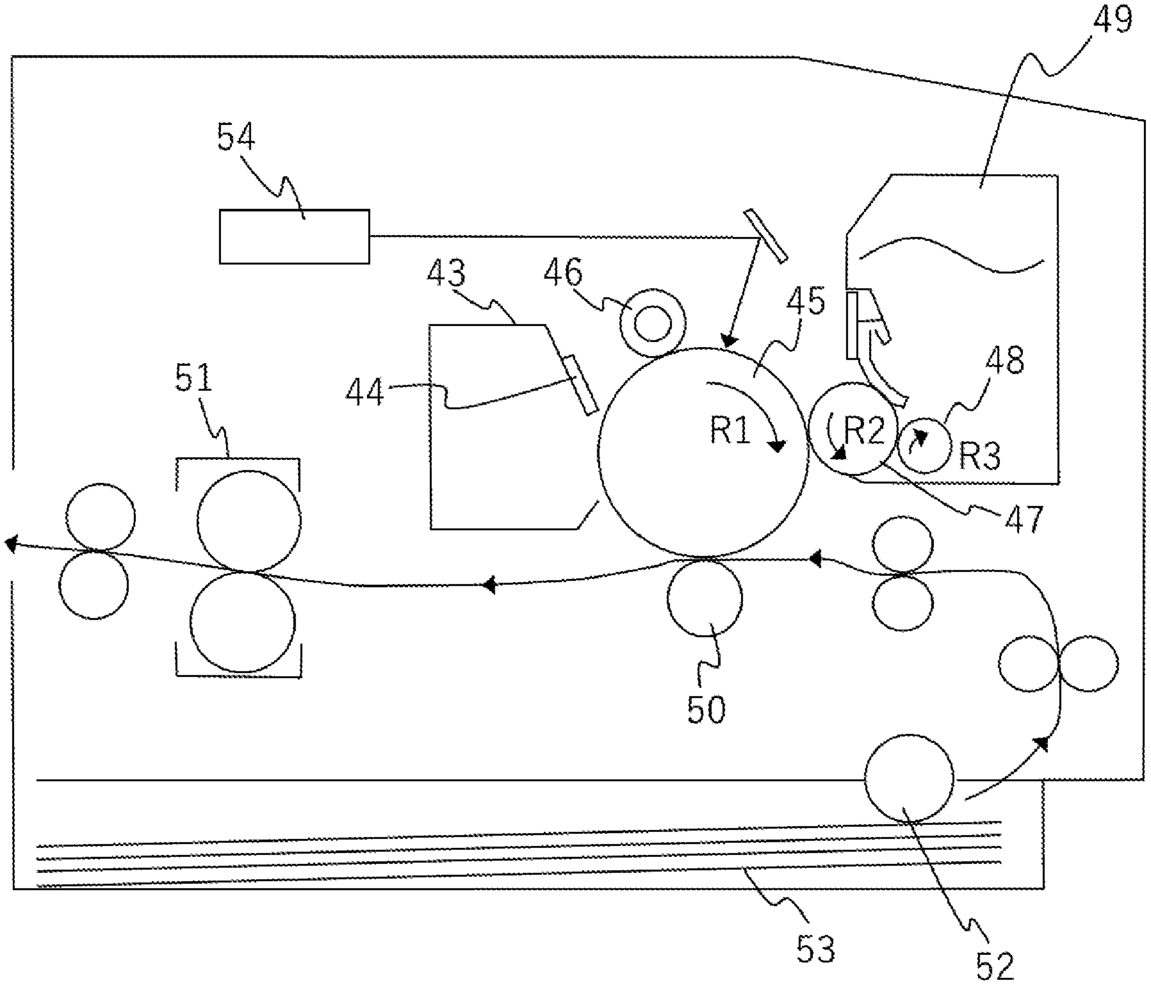
FIG. 4 is an example of an image forming apparatus according to a mono-component contact development system.

FIG. 3 is a schematic cross-sectional diagram illustrating an example of a developing apparatus. FIG. 4 is a schematic cross-sectional diagram illustrating an example of an image forming apparatus according to a mono-component contact development system.

In FIG. 3 and FIG. 4, the electrostatic latent image bearing member 45 on which the electrostatic latent image is formed is caused to rotate in the direction of arrow R1. As a result of the rotation of a toner carrying member 47 in the direction of arrow R2, a toner 57 becomes transported to a developing zone in which the toner carrying member 47 and the electrostatic latent image bearing member 45 face each other. A toner supply member 48 which is in contact with the toner carrying member 47 supplies the toner 57, to the surface of the toner carrying member 47, by rotating in the direction of arrow R3. The toner 57 is stirred by a stirring member 58.

A charging member (charging roller) 46, a transfer member (transfer roller) 50, a cleaner container 43, a cleaning blade 44, a fixing unit 51, a pickup roller 52 and so forth are provided around the electrostatic latent image bearing member 45. The electrostatic latent image bearing member 45 is charged by the charging roller 46. The electrostatic latent image bearing member 45 is exposed by being irradiated with laser light from a laser generator 54, whereupon an electrostatic latent image becomes formed that corresponds to the target image. The electrostatic latent image on the electrostatic latent image bearing member 45 is developed with the toner 57 in a developing apparatus 49, to yield a toner image.

The toner image is transferred onto a transfer material (paper) 53 by a transfer member (transfer roller) 50 that is in contact with the electrostatic latent image bearing member 45 via the transfer material. Transfer of the toner image to the transfer material may be accomplished via an intermediate transfer member. The transfer material (paper) 53 carrying a toner image is conveyed to the fixing unit 51 and is fixed on the transfer material (paper) 53. The toner 57 remaining on the electrostatic latent image bearing member 45 is scraped off by the cleaning blade 44, and is stored in the cleaner container 43.

Preferably, the thickness of the toner layer on the toner carrying member is regulated by bringing a toner regulating member (reference numeral 55 in FIG. 3) into contact with the toner carrying member across the toner. High image quality, without defective regulation, can be achieved as a result. A regulating blade is generally used as the toner regulating member that comes in contact with the toner carrying member.

The base of the regulating blade, at the upper side thereof, is fixed to the developing apparatus; the lower side of the regulating blade may be bent, in the forward or reverse direction of the toner carrying member, against the elastic force of the blade, such that in that state, the regulating blade is brought into contact against the surface of the toner carrying member, with an appropriate elastic pressing force.

As illustrated in FIG. 3, for instance one free end of the toner regulating member 55 may be sandwiched between two fixing members (for instance metal elastic bodies, reference numeral 56 in FIG. 3), the toner regulating member 55 being then fixed to the developing apparatus by way of a fastener.

Methods for measuring various physical property values will be described next.

Measurement of the Coverage Ratio X(A) by the Fatty Acid Metal Salt A, by X-Ray Photoelectron Spectroscopy The coverage ratio X(A) of the toner particle surface by the fatty acid metal salt A is measured by ESCA (X-ray photoelectron spectroscopy) (Quantum 2000, by Ulvac-Phi, Inc.).

As a sample holder there is used a 75 mm square platen (provided with a screw hole having a diameter of about 1 mm, for sample fixing) ancillary to the apparatus. A screw hole of the platen runs through the sample holder, and accordingly the hole is plugged with resin or the like, to produce a depressed portion for powder measurement having a depth of about 0.5 mm. A measurement sample (stand-alone toner or fatty acid metal salt A) is packed into the depressed portion, using a spatula or the like, and is shaved off, to produce a sample.

The ESCA measurement conditions are as follows.

Analysis method: narrow analysis

X-ray source: Al-Kα

X-ray conditions: 100μ, 25 W, 15 KV

Photoelectron capture angle: 45°

Pass energy: 58.70 eV

Measurement range: φ diameter 100 μm

The toner is measured first. Element peaks of the metal in the fatty acid metal salt A are used to calculate a quantitative value of the metal atoms in the fatty acid metal salt A in the toner. Herein X1 denotes the obtained quantitative value (cps) of the metal element upon measurement of the obtained toner.

An elemental analysis is performed for the stand-alone fatty acid metal salt A, where X2 denotes the obtained quantitative value (cps) of the metal element contained in the fatty acid metal salt A. If a sample of the fatty acid metal salt A is available, that sample is used as the stand-alone fatty acid metal salt A. A fatty acid metal salt A separated from the toner in accordance with the following method may also be used.

The value of X(A) is worked out in accordance with the formula below, using X1 and X2 above.

Coverage ratio $X(A)$ of the toner particle surface by the fatty acid metal salt $A = X1/X2$ Coverage ratio $X(A)$ (%) of the toner particle surface by the fatty acid metal salt $A = X1/X2 \times 100$ Measurement of the Content of the Fatty Acid Metal Salt A in the Toner The fatty acid metal salt A is separated from the toner in accordance with the following method, and the content of the fatty acid metal salt A is then measured.

Herein 1 g is added to and dispersed in 31 g of chloroform in a vial. Dispersion is accomplished as a result of a treatment using an ultrasonic homogenizer for 30 minutes, to produce a dispersion. The treatment conditions are as follows.

Ultrasonication device: ultrasonic homogenizer VP-050 (by Taitec Co., Ltd.)

Microchip: step-type microchip, tip diameter φ2 mm

Tip position of microchip: central portion of glass vial, at a height of 5 mm from the bottom of the vial Ultrasonic conditions: intensity 30%, 30 minutes Ultrasonic waves are applied while the vial is cooled in ice water so that the dispersion does not warm up.

The dispersion is transferred to a swing rotor glass tube (50 mL), and is centrifuged at 58.33 $s^{-1}$ for 30 minutes in a centrifuge (H-9R; by Kokusan Co., Ltd). Each material that makes up the toner in the glass tube after centrifugation is then separated. The materials are extracted and dried under vacuum conditions (40° C./24 hours). The fatty acid metal salt A is sorted and extracted, and the content thereof is measured.

Ascertainment of the Structure of Fatty Acid Metal Salt A (Carbon Number and Metal Element in F2)

The structure of the fatty acid metal salt A separated in accordance with the above procedure is determined by pyrolysis GCMS in the same way as in "Identification and Measurement of the Molecular Weight of a Monoester Wax by Mass Spectrometry" further on.

Measurement of the Coverage ratio S(A) of the Toner Particle Surface by the Fatty Acid Metal Salt A using a Scanning Electron Microscope The coverage ratio S(A) of the toner particle surface by the fatty acid metal salt A is measured using a scanning electron microscope "S-4800" (product name; by Hitachi Ltd.). Herein 100 toner particle are randomly captured in a field of view maximally magnified to 50,000 magnifications.

From each captured image there are measured a surface area "A" of a region of the toner onto which no fatty acid metal salt A is adhered, and a surface area "B" of a region onto which the fatty acid metal salt A is adhered; a proportion [B/(A+B)] of the coverage by the fatty acid metal salt A is calculated thereupon. The above coverage ratio is measured for 100 toner particles, and the arithmetic mean value thereof is taken as the coverage ratio S(A).

The region having the fatty acid metal salt A adhered thereonto is determined as follows.

In the above toner observation an EDS analysis is performed on each external additive; whether the external additive to be analyzed is the fatty acid metal salt A or not is determined then on the basis of the presence or absence of peaks of metal elements such as zinc, calcium, magnesium, aluminum or lithium.

A region other than the region to which the fatty acid metal salt A is adhered is taken as the region onto which no fatty acid metal salt A is adhered.

Volume-Basis Median Diameter (D50s) of the Fatty Acid Metal Salt A

The volume-basis median diameter of the fatty acid metal salt A is measured in accordance with JIS Z8825-1 (2001), specifically in the manner below.

The measuring device used herein is a laser diffraction/scattering particle size distribution measuring device "LA-920" (by Horiba Ltd.). Dedicated software "HORIBA LA-920 for Windows (registered trademark) WET (LA-920) Ver. 2.02", ancillary to LA-920, is used for setting measurement conditions and analyzing measurement data. Ion-exchanged water having had for instance solid impurities removed therefrom beforehand is used as the measurement solvent.

The measurement procedure is as follows.

(1) A batch cell holder is attached to LA-920.

(2) A specific amount of ion-exchanged water is added to a batch cell, and the batch cell is set in the batch cell holder.

(3) The interior of the batch cell is stirred using a dedicated stirrer tip.

(4) The "Refractive index" button is on the "Display condition settings" screen is pressed, and file "110A000I" (relative refractive index 1.10) is selected.

(5) The particle diameter basis is set to volume base on the "Display condition settings" screen.

(6) A warm-up operation is carried out for at least one hour, followed by optical axis adjustment, optical axis fine-tuning and blank measurement.

(7) Then 60 ml of ion-exchanged water are placed a 100 ml flat-bottom glass beaker. To the beaker there is added a dispersing agent in the form of 0.3 ml of a dilution of "Contaminon N" (10 mass % aqueous solution of a pH-7 neutral detergent for precision measuring instruments, made up of a nonionic surfactant, an anionic surfactant and an organic builder, by Wako Pure Chemical Industries, Ltd.), diluted thrice by mass in ion-exchanged water.

(8) An ultrasonic disperser is prepared that has an electrical output of 120 W "Ultrasonic Dispersion System Tetora 150" (by Nikkaki Bios Co., Ltd.), internally equipped with two oscillators that oscillate at a frequency of 50 kHz and are disposed at phases offset by 180 degrees. Then 3.3 L of ion-exchanged water are charged into the water tank of the ultrasonic disperser, and 2 mL of Contaminon N are added to the water tank.

(9) The beaker in (7) is set in a beaker-securing hole of the ultrasonic disperser, which is then operated. The height position of the beaker is adjusted so as to maximize a resonance state at the liquid surface of the aqueous solution in the beaker.

(10) With the aqueous solution in the beaker of (9) being ultrasonically irradiated, about 1 mg of the fatty acid metal salt is then added little by little to the aqueous solution in the beaker, to be dispersed therein. The ultrasonic dispersion treatment is further continued for 60 seconds. The fatty acid metal salt may at this time form clumps that float on the liquid surface; if that is the case, the beaker is shaken to submerge the clumps, after which ultrasonic dispersion is then performed for 60 seconds. The water temperature in the water tank during ultrasonic dispersion is adjusted as appropriate so as to range from 10° C. to 40° C.

(11) The aqueous solution having dispersed therein the fatty acid metal salt prepared in (10) is immediately added to the batch cell, little by little, while taking care that no air bubbles become entrained; the transmittance of a tungsten lamp is then adjusted to 90% to 95%. A particle size distribution is then measured. On the basis of the obtained volume-basis particle size distribution data there is calculated a 50% cumulative diameter from the small particle diameter side; this calculated value is taken as the median diameter (D50s).

Separation of a Toner Particle from Toner

Various physical properties can be measured using a toner particle resulting from removing the external additive from the toner in accordance with the method below.

Herein 160 g of sucrose (by Kishida Chemical Co. Ltd.) are added to 100 mL of ion-exchanged water and dissolved therein, while being warmed in a hot water bath, to prepare a sucrose concentrate. Then 31 g of this sucrose concentrate and 6 mL of Contaminon N (10 mass % aqueous solution of a pH-7 neutral detergent for precision measuring instruments, made up of a nonionic surfactant, an anionic surfactant and an organic builder, by Wako Pure Chemical Industries, Ltd.) are introduced into a centrifuge tube (50 mL volume).

Then 1.0 g of toner is added to this dispersion, and toner clumps are broken up using a spatula or the like. The centrifuge tube is shaken in a shaker (AS-1N, sold by AS ONE Corporation) for 20 minutes at 300 spm (strokes per minute). After shaking, the solution is transferred to a glass tube (50 mL volume) for swing rotors, and is centrifuged under conditions of 3500 rpm for 30 minutes, using a centrifuge (H-9R, by Kokusan Co. Ltd.).

As a result of this operation the toner particle becomes separated from the external additive. Sufficient separation of the toner particle and the aqueous solution is checked visually, and the toner particle separated into the uppermost layer is retrieved using a spatula or the like. The retrieved toner particle is filtered through a vacuum filter and is then dried for 1 hour or longer in a dryer, to yield a measurement sample. This operation is carried out a plurality of times, to secure the required amount.

Identification and Measurement of the Molecular Weight of a Monoester Wax by Mass Spectrometry Separation of a Monoester Wax from Toner The molecular weight of the monoester wax in the toner can be determined by measuring the toner; however, the molecular weight is more preferably measured after a separation operation has been performed.

The toner is dispersed in ethanol, which is a poor solvent of toner, and is heated to a temperature above the melting point of the monoester wax. Pressing may be performed at this time as the case may require. As a result of the above operation, the monoester wax thus warmed above the melting point thereof melts, and is extracted in the ethanol. In a case where pressure is applied, in addition to heating, the monoester wax can be separated from the toner by solid-liquid separation while under continued application of such pressure.

The obtained extract is then dried and solidified, to yield a monoester wax. The Monoester wax can be identified, and the molecular weight thereof can be measured by pyrolysis GCMS, using the following apparatus and under the measurement conditions below.

Mass spectrometer: ISQ by Thermo Fisher Scientific Inc.
GC device: Focus GC by Thermo Fisher Scientific Inc.
Ion source temperature: 250° C.
Ionization method: EI
Mass range: 50-1000 m/z
Column: HP-5MS (30 m)
Pyrolyzer: JPS-700 by Japan Analytical Industry Co., Ltd.

A small amount of the monoester wax separated as a result of an extraction operation and 1 μL of tetramethylammonium hydroxide (TMAH) are added to a pyrofoil at 590° C. The produced sample is subjected to a pyrolysis GCMS measurement under the above conditions, to yield respective peaks of the alcohol component and the carboxylic acid component that make up the monoester wax. The alcohol component and the carboxylic acid component are detected herein in the form of methylated products resulting from the action of TMAH, which is a methylating agent. The molecular weight of the monoester wax can be thereupon determined through analysis of the obtained peaks and identification of the structure of the monoester wax.

In a case where identification and measurement of the molecular weight of the monoester wax are carried out in accordance with a direct introduction method, the foregoing can be accomplished for instance using the following apparatus and under the measurement conditions below.

Mass spectrometer: ISQ by Thermo Fisher Scientific Inc.
Ion source temperature: 250° C.; electron energy: 70 eV
Mass range: 50-1000 m/z (CI)
Reagent gas: methane (CI)
Ionization method: Direct Exposure Probe (DEP) by Thermo Fisher Scientific Inc., 0 mA (10 sec)-10 mA/sec-1000 mA (10 sec)

The monoester wax separated as a result of the extraction operation is directly placed on a filament portion of the DEP unit, and is measured. The molecular ions in the mass spectrum of the main component peak in the obtained chromatogram, from around 0.5 to 1 minute, are checked, to identify the monoester wax and determine the molecular weight thereof.

Measurement of the Melting Point of the Monoester Wax

Herein 6 mg to 8 mg of the monoester wax are weighed in a sample holder and are then measured using a differential scanning calorimeter (by Seiko Instruments Inc., product name: RDC-220) under conditions that involve raising the temperature from −20° C. to 100° C. at 10° C./min, to obtain a DSC curve. The peak temperature of the endothermic peak of the DSC curve is taken as the melting point.

Method for Measuring the Glass Transition Temperature of Toner

The glass transition temperature of the toner is measured according to ASTM D3418-97.

Specifically, 10 mg of toner obtained by drying are weighed exactly and are placed in an aluminum pan. An empty aluminum pan is used as a reference. The glass transition temperature of the toner having been exactly weighed is measured in accordance with ASTM D 3418-97, using a differential scanning calorimeter (by Hitachi High-Tech Science Corporation product name: DSC6220), under conditions that include a measurement temperature range from 0° C. to 150° C., and a ramp rate of 10° C./min.

Measurement of the Content of the Monoester Wax in the Toner

The monoester wax content in the toner can be measured using a thermal analyzer (product name: DSC Q2000, by TA Instruments Japan Ltd.).

Herein 5.0 mg of toner are placed in a sample container of an aluminum pan (KIT No. 0219-0041), the sample container is set on a holder unit, and the holder unit is in turn set in an electric furnace. Then a DSC curve is measured, using a differential scanning calorimeter (DSC), upon heating from 30° C. to 200° C. at a ramp rate of 10° C./min in a nitrogen atmosphere, and an endothermic quantity of the monoester wax in the toner is calculated. The endothermic quantity is calculated in accordance with a similar method, using a 5.0 mg sample of stand-alone monoester wax. The content of the monoester wax is worked out in accordance with the expression below, using the endothermic quantity of the monoester wax obtained in the measurements.

Content of monoester wax in toner (mass %)=(endothermic quantity (J/g) of monoester wax in toner sample)/(endothermic quantity (J/g) of stand-alone monoester wax)×100

Measurement of the Weight-Average Molecular Weight (Mw) and Peak Molecular Weight (Mp) of a Resin etc.

The weight-average molecular weight (Mw) and the peak molecular weight (Mp) of a resin are measured by gel permeation chromatography (GPC), as follows.

(1) Preparation of a Measurement Sample

A sample and tetrahydrofuran (THF) are mixed to a concentration of 5.0 mg/mL, and the resulting mixture is allowed to stand at room temperature for 5 to 6 hours, followed by vigorous shaking to thoroughly mix the THF and the sample until the sample no longer coalesces. The mixture is allowed to stand at room temperature for 12 hours or longer. The time elapsed from the start of mixing the sample and THF until standing is over is herein set to 72 hours or longer, to yield a tetrahydrofuran (THF)-soluble fraction of the sample.

The above fraction is thereafter filtered using a solvent-resistant membrane filter (pore size 0.45 μm to 0.50 μm, MYSYORI DISC H-25-2, by Tosoh Corporation), to yield a sample solution.

(2) Sample Measurement

A measurement is performed then under the following conditions, using the obtained sample solution.

Apparatus: High-speed GPC apparatus LC-GPC 150C (by Waters Corporation)
Column: 7 columns of Shodex GPC KF-801, 802, 803, 804, 805, 806, 807 (by Showa Denko KK)
Mobile phase: THF
Flow rate: 1.0 mL/min
Column temperature: 40° C.
Sample injection volume: 100 μL
Detector: RI (refractive index) detector To measure the molecular weight of a sample, the molecular weight distribution of the sample is calculated on the basis of a relationship between logarithmic values of a calibration curve prepared from several types of monodisperse polystyrene standard samples and count numbers.

Standard polystyrene samples having molecular weights of $6.0\times10^2$, $2.1\times10^3$, $4.0\times10^3$, $1.75\times10^4$, $5.1\times10^4$, $1.1\times10^5$, $3.9\times10^5$, $8.6\times10^5$, $2.0\times10^6$ and $4.48\times10^6$, available from Pressure Chemical Co. or Tosoh Corporation, are used herein as standard polystyrene samples for creation of a calibration curve.

Measurement of the Fixing Ratio of Fatty Acid Metal Salt A Treatment in a Dispersion Herein 160 g of sucrose (by Kishida Chemical Co. Ltd.) are added to 100 mL of ion-exchanged water and dissolved therein while being warmed in a hot water bath, to prepare a sucrose concentrate. Thereupon, 31 g of this sucrose concentrate and 6 mL of Contaminon N (10 mass % aqueous solution of a pH-7 neutral detergent for cleaning of precision measuring instruments, made up of a nonionic surfactant, an anionic surfactant and an organic builder, by Wako Pure Chemical Industries, Ltd.) are introduced into a centrifuge tube (50 ml volume), to produce a dispersion. Then 1.0 g of toner is added to this dispersion, and toner clumps are broken up using a spatula or the like.

The centrifuge tube is shaken in a shaker ("KM Shaker" by Iwaki Industry Co., Ltd.) for 20 minutes at 350 spm (strokes per minute). After shaking, the resulting solution is transferred to a glass tube (50 mL volume) for swing rotors, and is centrifuged under conditions of 3500 rpm for 30 minutes, using a centrifuge (H-9R, by Kokusan Co. Ltd.).

Upon visual confirmation that separation of the toner and the aqueous solution is sufficient, the toner having separated at the uppermost layer is collected using for instance a spatula. The aqueous solution containing the collected toner is filtered using a vacuum filter and is dried in a drier for 1 hour or longer. The dried product is pulverized using a spatula, to yield a dispersion-treated toner.

The amount of metal element contained in the fatty acid metal salt A, in the dispersion-treated toner, is then measured by X-ray fluorescence. The fixing ratio (%) of the fatty acid metal salt A is calculated from a ratio of the amount of the element to be measured, between the dispersion-treated toner and the toner before treatment.

Herein the X-ray fluorescence measurement of various elements conforms to JIS K 0119-1969, and is specifically as follows.

The measuring device utilized is a wavelength-dispersive X-ray fluorescence analyzer "Axios" (by PANalytical B. V.), with ancillary dedicated software "SuperQ Ver. 4.0F" (by PANalytical B. V.) for setting measurement conditions and analyzing measurement data. Rhodium (Rh) is used as the anode of the X-ray tube, the measurement atmosphere is vacuum, the measurement diameter (collimator mask diameter) is set to 10 mm, and the measurement time to 10 seconds. Detection is carried out using a proportional counter (PC) to measure light elements, and using a scintillation counter (SC) to measure heavy elements.

To obtain respective measurement samples, 1 g of each of the above dispersion-treated toner, and of the toner before treatment (initial toner), are placed in a dedicated aluminum ring for pressing having a diameter of 10 mm, and the toner is smoothed over; then measurement samples are obtained in the form of respective pellets shaped to a thickness of about 2 mm through pressing for 60 seconds at 20 MPa using a tablet compression molder "BRE-32" (by Maekawa Testing Machine Mfg. Co. Ltd.).

The measurement is carried out under the above conditions, whereupon elements are identified on the basis of the obtained X-ray peak positions; element concentrations are calculated from a count rate (units: cps), which is the number of X-ray photons per unit time.

A quantitative method in the toner will be explained next relying on an example of an instance where the fatty acid metal salt A is zinc stearate. Herein 0.5 parts by mass of a zinc stearate fine powder are added to 100 parts by mass of a toner particle, and the whole is thoroughly mixed using a coffee mill. Similarly, 1.0 parts by mass and 2.0 parts by mass of zinc stearate are mixed with a respective toner particle, respectively, the resulting mixtures being used as calibration curve samples.

For each sample there are produced pellets of calibration curve samples, using a tablet compression molder as described above, and a Kα ray net intensity of the metal element of the fatty acid metal salt is then measured. A calibration curve in the form of a linear function is then derived, with the obtained X-ray count rate on the vertical axis and the respective addition amounts of the fatty acid metal salt A in the respective calibration curve samples on the horizontal axis.

The Kα ray net intensity of the metal element of the fatty acid metal salt is measured next using a pellet of the toner to be analyzed. The content of the fatty acid metal salt A in the toner is worked out on the basis of the above calibration curve. The ratio of the element amount in the dispersion-treated toner relative to the element amount in the toner before treatment, calculated in accordance with the above method, is worked out and taken as the fixing ratio (%).

Fixing ratio (%)=Amount of metal element in the dispersion-treated toner/amount of metal element in the toner before treatment×100

Identification of a Hydrophobic Treatment Agent in a Magnetic Body

Herein 10 mL of chloroform are added to 100 mg of toner, and the whole is treated in a homogenizer for 10 minutes, to dissolve the binder resin. The magnetic body is thereafter recovered using a magnet. The magnetic body is isolated by repeating this operation several times.

The obtained magnetic body is subjected to pyrolysis GCMS under the conditions below. A pyrolyzed product of the hydrophobic treatment agent is obtained as a result of the measurement, and accordingly the carbon number of the hydrophobic treatment agent is worked out on the basis of the main component. The pyrolyzed product is detected in the form of an alkyl substituent of the hydrophobic treatment agent, or in the form of a double bond-modified product, an alkylsilane or the like, of the alkyl substituent of the hydrophobic treatment agent.

Pyrolysis GCMS

Mass spectrometer: ISQ by Thermo Fisher Scientific Inc.
GC apparatus: Thermo Fisher Scientific Inc., Focus GC
Ion source temperature: 250° C.
Ionization method: EI
Mass range: 50-1000 m/z
Column: HP-5MS (30 m)
Pyrolyzer: Nippon Analytical Industry Co., Ltd., JPS-700

Ascertainment of the Uneven Distribution of the Inorganic Fine Particles (Magnetic Body etc.) Near the Surface of the Toner Particle Whether "the inorganic fine particle is unevenly distributed in the vicinity of the surface of the toner particle" is assessed for the following cases.

In a cross section of the toner, observed using a scanning transmission electron microscope, A is defined as the area ratio taken up by the magnetic body, within a range from the contour of the cross section of the toner to less than 10% of the distance between the contour and the centroid (geometrical center) of the cross section. The inorganic fine particle is deemed to be unevenly distributed in the vicinity of the toner particle surface in a case where the value of A is 30% or higher.

The procedure for observing a toner cross section is as follows.

The toner is enveloped in a visible-light-curable resin (D-800, by Nisshin-EM Co., Ltd.), and the resin is cut to a thickness of 70 nm using an ultrasonic ultramicrotome (UC7, by Leica Microsystems GmbH). Among the obtained flake samples there are arbitrarily selected 10 samples having a toner cross-sectional diameter within ±2.0 μm of the weight-average particle diameter (D4) of the toner particle.

Each selected flake sample is stained for 15 minutes in a $RuO_4$ gas atmosphere, at 500 Pa, using a vacuum staining device (VSC4R1H, by Filgen, Inc.), whereupon a STEM image is acquired using a scanning transmission electron microscope (JEM2800, by JEOL Ltd.) in a scan image mode.

The probe size used for capturing the STEM image is set to 1.0 nm, and the image size is set to 1024×1024 pixels. Contrast in the Detector Control panel for a bright-field image is adjusted to 1425 and Brightness to 3750; Contrast in the Image Control panel is adjusted to 0.0, Brightness to 0.5, and Gamma to 1.00, to acquire a STEM image.

The obtained STEM image is binarized by image processing software "Image-Pro Plus (by Media Cybernetics Inc.)" to highlight the distinction between the regions of the binder resin and of the inorganic fine particles, for instance the magnetic body and so forth.

Calculation of SP Values

Herein SP values are worked out in accordance with the calculation method proposed by Fedors.

The evaporation energy (Δei) (cal/mol) and the molar volume (Δvi) ($cm^3$/mol) of the atoms or atomic groups in respective molecular structures are worked out on the basis of the tables in Polym. Eng. Sci., 14 (2), 147-154 (1974)", where $(\Sigma\Delta ei/\Sigma\Delta vi)^{0.5}$ is the SP value $(cal/cm^3)^{0.5}$.

Specifically, the evaporation energy (Δei) and the molar volume (Δvi) of alkyl groups are determined, and the evaporation energy is divided by the molar volume, in a calculation according to the following formula.

$$\text{SP value}=\{(\Sigma j\times\Sigma\Delta ei)/(\Sigma j\times\Sigma\Delta vi)\}^{0.5}$$

Method for Measuring the Volume-Average Particle Diameter (Dv) and Number-Average Particle Diameter (D1)

The volume-average particle diameter (Dv) and number-average particle diameter (D1) of toner, a toner particle, or a toner base particle (hereafter also referred to as toner etc.) are calculated as follows.

The measuring device used herein is a precision particle size distribution measuring device "Coulter Counter Multisizer 3" (registered trademark, by Beckman Coulter, Inc.) relying on a pore electrical resistance method and equipped with a 100 μm aperture tube.

Measurement conditions are set, and measurement data analyzed, using dedicated software (Beckman Coulter Multisizer 3, Version 3.51", by Beckman Coulter, Inc.) ancillary to the device. The measurements are performed in 25,000 effective measurement channels.

An electrolytic aqueous solution that can be used in the measurements results from dissolution of special-grade sodium chloride to a concentration of about 1.0% in ion-exchanged water, and may be for instance "ISOTON II" (by Beckman Coulter, Inc.).

The dedicated software is set up as follows, prior to measurement and analysis.

In the screen of "Modification of the Standard Measurement Method (SOMME)" of the dedicated software, a Total Count of the Control Mode is set to 50,000 particles, the number of measurements is set to one, and a Kd value is set to a value obtained using "Standard particles 10.0 μm" (by Beckman Coulter Inc. The "Threshold/Noise Level Measurement Button" is pressed, to thereby automatically set a threshold value and a noise level. Then the current is set to 1600 μA, the gain is set to 2, the electrolytic aqueous solution is set to ISOTON II, and "Flushing of the Aperture Tube Following Measurement" is ticked.

In the screen for "Setting of Conversion from Pulses to Particle Diameter" of the dedicated software, the Bin Interval is set to a logarithmic particle diameter, the Particle Diameter Bin is set to 256 particle diameter bins, and the Particle Diameter Range is set to a range from 2 μm to 60 μm.

The concrete measuring method is as follows.

(1) Herein 200.0 mL of the electrolytic aqueous solution are placed in a dedicated 250 mL round-bottomed glass beaker ancillary to Multisizer 3, and the beaker is set on a sample stand and is stirred counterclockwise with a stirrer rod at 24 rotations/second. Dirt and air bubbles are then removed from the aperture tube by way of the "Aperture Flush" function of the dedicated software.

(2) Then about 30.0 mL of the electrolytic aqueous solution are placed in a 100 mL flat-bottomed glass beaker. To the beaker there is added a dispersing agent in the form of 0.3 mL of a dilution of "Contaminon N" (10 mass % aqueous solution of a pH-7 neutral detergent for precision measuring instruments, made up of a nonionic surfactant, an anionic surfactant and an organic builder, by Wako Pure Chemical Industries, Ltd.), diluted thrice by mass in ion-exchanged water.

(3) An ultrasonic disperser is prepared having an electrical output of 120 W, "Ultrasonic Dispersion System Tetora 150" (by Nikkaki Bios Co., Ltd.), internally equipped with two oscillators that oscillate at a frequency of 50 kHz and are disposed at phases offset by 180 degrees. Then 3.3 L of ion-exchanged water are charged into a water tank of the ultrasonic disperser, and 2.0 mL of Contaminon N are added to the water tank.

(4) The beaker in (2) is set in a beaker-securing hole of the ultrasonic disperser, which is then operated. The height position of the beaker is adjusted so as to maximize a resonance state at the liquid surface of the electrolytic aqueous solution in the beaker.

(5) With the electrolytic aqueous solution in the beaker of (4) being ultrasonically irradiated, about 10 mg of the toner or the like are then added little by little to the electrolytic aqueous solution, to be dispersed therein. The ultrasonic dispersion treatment is further continued for 60 seconds. The water temperature in the water tank during ultrasonic dispersion is adjusted as appropriate so as to range from 10° C. to 40° C.

(6) The electrolytic aqueous solution in (5) having the toner or the like dispersed therein is added dropwise, using a pipette, to the round-bottomed beaker of (1) set in the sample stand, and the measurement concentration is adjusted to about 5%. A measurement is then performed until the number of measured particles reaches 50,000.

(7) Measurement data is analyzed using the dedicated software ancillary to the apparatus, to calculate the volume-average particle diameter (Dv) and the number-average particle diameter (D1). The "Average Diameter" in the "Analysis/Volume Statistics (arithmetic mean)" screen, with Graph/volume % set in the dedicated software, yields herein the volume-average particle diameter (Dv). The "Average Diameter" in the "Analysis/Number Statistics (arithmetic mean)" screen, with Graph/number % set in the dedicated software, yields the number-average particle diameter (D1).

EXAMPLES

The present disclosure will be specifically described below with reference to examples, but the present disclosure is not limited to these examples. Unless particularly noted otherwise, the language "parts" refers to mass basis in all instances.

Production Example of Monoester Wax 1

To a reaction vessel equipped with a thermometer, a nitrogen introduction tube, a stirrer, a Dean-Stark trap and a Dimroth condenser there were added 100 parts of behenyl alcohol as an alcohol monomer and 80 parts of stearic acid as a carboxylic acid monomer, and an esterification reaction was carried out at 200° C. for 15 hours.

Then 20 parts of toluene and 25 parts of isopropanol were added to the obtained ester compound, with further addition of 190 parts of a 10% aqueous solution of potassium hydroxide in an amount corresponding to 1.5 times the acid value of the ester compound, and the whole was stirred at 70° C. for 4 hours. The water tank part was removed thereafter. Then 20 parts of ion-exchanged water were further added, with stirring at 70° C. for 1 hour, followed by removal and washing of the water tank. The above washing step was repeated until the pH in the removed water tank was neutral.

Thereafter, the solvent was removed under reduced pressure, at 200° C. and 1 kPa, to yield a final product in the form of behenyl stearate (Monoester wax 1) which is an ester compound of behenyl alcohol and stearic acid. Table 1 sets out the physical properties of the obtained Monoester wax 1.

TABLE 1

| | | F1 | A1 | SPw $(cal/cm^3)^{0.5}$ | Melting point (° C.) | Molecular weight |
|---|---|---|---|---|---|---|
| Monoester wax 1 | Behenyl stearate | 18 | 22 | 8.59 | 67 | 593 |
| Monoester wax 2 | Behenyl behenate | 22 | 22 | 8.58 | 73 | 649 |

Herein F1 denotes the carbon number of the fatty acid F1, and A1 denotes the carbon number of the alcohol A1. Further, SPw is the SP value of the monoester wax.

Production Example of Monoester Wax 2

Monoester wax 2 was obtained in the same way as in the production example of Monoester wax 1, but modifying herein the monomers so that the compounds given in Table 1 were obtained. Table 1 sets out the physical properties of the obtained Monoester wax 2.

Production Example of Fatty Acid Metal Salt A1

A receiving vessel with a stirrer was prepared and the stirrer was caused to rotate at 350 rpm. Then 500 parts of a 0.5 mass % aqueous solution of sodium stearate were added to the receiving vessel, and the liquid temperature was adjusted to 85° C. Next, 525 parts of a 0.2 mass % aqueous solution of zinc sulfate were added dropwise to the receiving vessel over 15 minutes. Once the total amount was charged, the mixture was thereafter aged for 10 minutes, at the reaction temperature, to finish the reaction.

The obtained fatty acid metal salt slurry thus obtained was then filtered and washed. The resulting fatty acid metal salt cake after washing was coarsely crushed and dried at 105° C., using a continuous flash dryer. This was followed by pulverization using a Nano Grinding Mill "NJ-300" (by Sunrex Co., Ltd.) at an air flow of 6.0 $m^3$/min and at a processing rate of 80 kg/h, after which the product was re-slurried and fine particles and coarse particles were removed using a wet centrifugal classifier. The product was thereafter dried at 80° C. using a continuous flash dryer, to yield fine particles of Fatty acid metal salt A1.

The volume-basis median diameter (D50s) of the obtained Fatty acid metal salt A1 was 0.45 μm. Table 2 sets out the physical properties of Fatty acid metal salt A1.

TABLE 2

| | F2 carbon number | Metal | Median diameter (μm) | SP value of alkyl chain |
|---|---|---|---|---|
| Fatty acid metal salt A1 | 18 | Zn | 0.45 | 8.30 |
| Fatty acid metal salt A2 | 12 | Zn | 0.45 | 8.18 |
| Fatty acid metal salt A3 | 10 | Zn | 0.45 | 8.11 |
| Fatty acid metal salt A4 | 20 | Zn | 0.45 | 8.33 |
| Fatty acid metal salt A5 | 18 | Al | 0.45 | 8.30 |

The units of the SP value are $(cal/cm^3)^{0.5}$.

Production Example of Fatty Acid Metal Salt A2

Fatty acid metal salt A2 was obtained in the same way as in production example of Fatty acid metal salt A1, but herein the 0.5 mass % aqueous solution of sodium stearate was modified to a 0.5 mass % aqueous solution of sodium laurate. Table 2 sets out the physical properties of the obtained Fatty acid metal salt A2.

Production Example of Fatty Acid Metal Salt A3

Fatty acid metal salt A3 was obtained in the same way as in production example of Fatty acid metal salt A1, but herein the 0.5 mass % aqueous solution of sodium stearate was modified to a 0.5 mass % aqueous solution of sodium caprate. Table 2 sets out the physical properties of the obtained Fatty acid metal salt A3.

Production Example of Fatty Acid Metal Salt A4

Fatty acid metal salt A4 was obtained in the same way as in production example of Fatty acid metal salt A1, but herein the 0.5 mass % aqueous solution of sodium stearate was modified to a 0.5 mass % aqueous solution of sodium arachidate. Table 2 sets out the physical properties of the obtained Fatty acid metal salt A4.

Production Example of Fatty Acid Metal Salt A5

Fatty acid metal salt A5 was obtained in the same way as in production example of Fatty acid metal salt A1, but herein the 0.2 mass % aqueous solution of zinc sulfate was modified to a 0.2 mass % aqueous solution of aluminum chloride. Table 2 sets out the physical properties of the obtained Fatty acid metal salt A5.

Production Example of Fatty Acid Metal Salt-Silica Composite Particles 1

(Produced on the basis of on the method for producing composite particles disclosed in Japanese Patent Application Publication No. 2018-054705)

Fatty Acid Metal Salt Particles

Zinc stearate particles, product name: zinc stearate, 1.5 μm, by Wako Pure Chemical Industries, Ltd., average particle diameter=1.5 μm Silica Fine Particles Hydrophobized silica fine particles having a number-average primary particle diameter of 50 nm Herein 100 parts of the above fatty acid metal salt particles and 6.0 parts of silica fine particles were mixed and were then blended for 10 minutes in a powder treatment apparatus (Nobilta NOB130, by Hosokawa Micron Corporation), at a clearance of 3 mm and at a peripheral speed of 1500 rpm while cooling water was caused to flow through the jacket; thereafter, coarse particles were removed using a sieve with a mesh opening of 45 μm, to yield fatty acid metal salt-silica composite particles with a low coverage ratio.

Meanwhile, fatty acid metal salt-silica composite particles of high coverage ratio rate were obtained in the same way as in the case of the above composite particles of low coverage ratio, but herein the amount of the silica particles was modified to 9.5 parts.

Next, the fatty acid metal salt-silica composite particles of low coverage ratio and the fatty acid metal salt-silica composite particles of high coverage ratio were mixed at a 50:50 mass ratio, to yield Fatty acid metal salt-silica composite particles 1.

Production Example of Inorganic Fine Particle 1

Into an aqueous solution of ferrous sulfate there was mixed a caustic soda solution (containing 1 mass % of sodium hexametaphosphate on a P basis referred to Fe), in an amount of 1.0 equivalent of iron ions, to prepare an aqueous solution containing ferrous hydroxide. Air was blown into the aqueous solution while the pH thereof was maintained at 9, and an oxidation reaction was conducted at 80° C., to prepare a slurry for producing seed crystals.

Next, an aqueous solution of ferrous sulfate was added to the slurry, in an amount of 1.0 equivalent with respect to the initial alkali amount (sodium component of caustic soda). The slurry was maintained at pH 8, and the oxidation reaction was allowed to proceed while air was blown in; at the later stage of the oxidation reaction the pH was adjusted to 6, and the slurry was washed with water and was dried, to yield spherical magnetite particles as a magnetic iron oxide having a number-average particle diameter of primary particles of 200 nm.

Then 10.0 kg of the above magnetic iron oxide were placed in a Simpson Mix-Muller (model MSG-0 L by Shin-Nitto Kogyo Ltd.), and were deagglomerated for 30 minutes.

Thereafter, 95 g of n-decyltrimethoxysilane as a silane coupling agent were added into the apparatus, which was operated for 1 hour, to treat the particle surface of the magnetic iron oxide with the silane coupling agent, and yield as a result Inorganic fine particle 1 (magnetic body). Table 3 sets out the physical properties of Inorganic fine particle 1.

TABLE 3

| | Hydrophobic treatment agent | Alkyl substituent | Average primary particle diameter (nm) | SP value of alkyl substituent |
|---|---|---|---|---|
| Inorganic fine particles 1 | n-decyltrimethoxysilane | C10 | 200 | 8.11 |
| Inorganic fine particles 2 | n-hexyltrimethoxysilane | C6 | 200 | 7.85 |
| Inorganic fine particles 3 | n-butyltrimethoxysilane | C4 | 200 | 7.55 |

The column of alkyl substituent denotes the number of carbon atoms in the alkyl group of the surface treatment agent of the magnetic body.

The units of the SP value are $(cal/cm^3)^{0.5}$.

Production Examples of Inorganic Fine Particles 2 and 3

Inorganic fine particles 2 and 3 were obtained in the same way as in the production example of Inorganic fine particle 1, but herein the hydrophobic treatment agent was modified as given in Table 3.

Production Example of Vinyl Resin 1

A reaction vessel equipped with a reflux condenser, a stirrer, a thermometer and a nitrogen introduction tube was charged with the following materials, under a nitrogen atmosphere.

| | |
|---|---|
| Solvent toluene | 100.0 parts |
| Monomer composition | 100.0 parts |

(The monomer composition was a mixture of styrene, n-butyl acrylate and divinylbenzene below, in the proportions given below.)

| | |
|---|---|
| (Styrene | 78.0 parts) |
| (n-butyl acrylate | 22.0 parts) |
| (Divinylbenzene | 0.50 parts) |
| Polymerization initiator | 0.50 parts |
| t-butyl peroxypivalate (by NOF Corporation: Perbutyl PV) | |

While the interior of the reaction vessel was stirred at 200 rpm, a polymerization reaction was conducted for 12 hours through heating at 70° C., to obtain a solution resulting from dissolution of a polymer of the monomer composition in toluene. The solution was then cooled down to 25° C., and thereafter was added into 1000.0 parts of methanol while under stirring, to elicit to precipitation of a methanol-insoluble fraction. The obtained methanol-insoluble fraction was separated by filtration, was further washed with methanol, and was thereafter vacuum-dried at 40° C. for 24 hours, to yield Vinyl resin 1. The weight-average molecular weight (Mw) of Vinyl resin 1 was 21,000.

Production Example of Toner Particle 1

Herein 450 parts of a 0.1 mol/L aqueous solution of $Na_3PO_4$ were added to 720 parts of ion-exchanged water, and the whole was heated at a temperature of 60° C., followed by addition of 67.7 parts of a 1.0 mol/L aqueous solution of $CaCl_2$, to yield an aqueous solution that contained a dispersion stabilizer.

| | |
|---|---|
| Styrene: | 78.0 parts |
| n-butyl acrylate: | 22.0 parts |
| Divinylbenzene: | 0.50 parts |
| Inorganic fine particle 1: | 65.0 parts |

The above formulation was uniformly dispersed and mixed using an attritor (by Nippon Coke & Engineering Co., Ltd.).

The obtained monomer composition was heated to a temperature of 60° C., and the materials below were further mixed in and dissolved, to yield a polymerizable monomer composition.

| | |
|---|---|
| Hydrocarbon wax: | 6.0 parts |
| (Fischer-Tropsch wax (HNP-51 by Nippon Seiro Co., Ltd.)) | |
| Monoester wax 1: | 20.0 parts |
| Polymerization initiator: | 10.0 parts |
| (t-butyl peroxypivalate (25% toluene solution) | |
| Negative charge control agent T-77 (by Hodogaya Chemical Co., Ltd.): | 1.0 part |

The polymerizable monomer composition was added to the aqueous medium and the whole was stirred at 12,000 rpm for 15 minutes at a temperature of 60° C., in a nitrogen atmosphere, using a TK-type homomixer (by Tokushu Kika Kogyo Co., Ltd.), to elicit granulation. Thereafter, the mixture was stirred using paddle stirring blades, and a polymerization reaction was carried out for 300 minutes at a reaction temperature of 70° C.

Once the reaction was over, the resulting suspension was heated up to 100° C. and was held for 2 hours. As a cooling step, water at 0° C. was thereafter added to the suspension, and the suspension was cooled from 98° C. down to 30° C. at a rate of 200° C./min, after which the temperature was held at 55° C. for 3 hours. This was followed by cooling down to 25° C. by natural cooling at room temperature. The cooling rate at that time was 2° C./min. Thereafter, hydrochloric acid was added to the suspension, to thoroughly wash thereby the suspension and dissolve as a result the dispersion stabilizer, with subsequent filtering and drying to yield Toner particle 1.

Production Examples of Toner Particles 2, 3, 5 and 6

Toner particles 2, 3, 5 and 6 were obtained in the same way as in production example of Toner particle 1, but herein Inorganic fine particles 1, Monoester wax 1, a colorant, and a release agent were modified as given in Table 4.

TABLE 4

| | Production method | Inorganic fine particle (parts) | Colorant (parts) | Monoester wax (parts) | Release agent (parts) | Inorganic fine particle shell |
|---|---|---|---|---|---|---|
| Toner particle 1 | Suspension polymerization | Inorganic fine particle 1(65.0) | — | Monoester wax 1(20.0) | HNP-51(6.0) | Yes |
| Toner particle 2 | Suspension polymerization | Inorganic fine particle 2(65.0) | — | Monoester wax 1(20.0) | HNP-51(6.0) | Yes |
| Toner particle 3 | Suspension polymerization | Inorganic fine particle 3(65.0) | — | Monoester wax 1(20.0) | HNP-51(6.0) | Yes |
| Toner particle 4 | Suspension polymerization | — | Carbon black(7.0) | Monoester wax 1(20.0) | HNP-51(6.0) | No |
| Toner particle 5 | Suspension polymerization | Inorganic fine particle 1(65.0) | — | Monoester wax 2(20.0) | HNP-51(6.0) | Yes |
| Toner particle 6 | Suspension polymerization | Inorganic fine particle 1(65.0) | — | — | HNP-51(26.0) | Yes |
| Toner particle 7 | Pulverization | Inorganic fine particle 1(65.0) | — | Monoester wax 1(20.0) | HNP-51(6.0) | No |

In the column of inorganic fine particle shell "Yes" indicates that inorganic fine particles are unevenly distributed in the vicinity of the surface of the toner particle, to form a shell state. Further, "No" indicates that inorganic fine particles are not unevenly distributed in the vicinity of the surface of the toner particle.

Production Example of Toner Particle 4

Toner particle 4 was obtained in the same way as in production example of Toner particle 1, but herein 65.0 parts of Inorganic fine particles 1 were modified to 7.0 parts of carbon black (by Mitsubishi Chemical Corporation, product name: #25B).

<Production Example of Toner Particle 7> (Pulverization)

| | |
|---|---|
| Vinyl resin 1: | 100.0 parts |
| Monoester wax 1: | 20.0 parts |
| Inorganic fine particles 1: | 65.0 parts |
| Hydrocarbon wax: (Fischer-Tropsch wax (HNP-51 by Nippon Seiro Co., Ltd.)) | 6.0 parts |

The above materials were pre-mixed using a Henschel mixer (by Nippon Coke & Engineering Co., Ltd.), and were then melt-kneaded in a twin-screw kneading extruder (by Ikegai Corp.: PCM-30 model).

The obtained kneaded product was cooled, was coarsely pulverized in a hammer mill, and was thereafter pulverized in a mechanical pulverizer (by Turbo Kogyo Co., Ltd.: T-250), whereupon the obtained finely pulverized powder was classified using a multi-grade classifier relying on the Coanda effect, to yield Toner particle 7 having a volume-average particle diameter (Dv) of 7.4 μm.

Production Example of Toner 1

To 100 parts of Toner particle 1 there were added 0.50 parts of hydrophobized silica fine particles having a number-average primary particle diameter of 50 nm, as an external additive, and External addition/mixing treatment 1 was carried out through mixing for 11 minutes at 2970 rpm, using Henschel mixer FM10C (HM) (Nippon Coke & Engineering Co., Ltd.).

Thereafter, 0.10 parts of Fatty acid metal salt A1 were further added, and External addition/mixing treatment 2 was performed through mixing for 1 minute at 2970 rpm, using the Henschel mixer FM10C.

Thereafter, External addition/mixing treatment 3 was carried out using the apparatus illustrated in FIG. 1.

In terms of the configuration of the apparatus illustrated in FIG. 1 an apparatus was used in which the diameter of the inner periphery of the body casing 31 was 130 mm and the volume of the treatment space 39 was $2.0\times10^{-3}$ $m^3$, with the rated power of the drive member 38 being set to 5.5 kW and the shapes of the stirring blades 33 being set to the shape illustrated in FIG. 2. The overlap width d of the stirring blades *33a* and stirring blades *33b* in FIG. 2 was set to 0.25D with respect to a maximum width D of the stirring blades 33, and the clearance between the stirring blades 33 and the inner periphery of the body casing 31 was set to 6.0 mm Then 740 g of the toner particle having undergone External addition/mixing treatment 2 were charged into the apparatus illustrated in FIG. 1, and External addition/mixing treatment 3 was carried out. The conditions of External addition/mixing treatment 3 included adjusting the peripheral velocity of the outermost end of the stirring blades 33 so that the revolutions of the drive member 38 were constant at 1100 rpm, with adjustment of the treatment time to 3 minutes.

After External addition/mixing treatment 3, coarse particles and so forth were removed using a circular vibrating sieve machine equipped with a screen having a diameter of 500 mm and a mesh opening of 75 μm, to yield Toner 1. Tables 5-1 and 5-2 set out external addition conditions of Toner 1. Table 6 sets out physical properties.

TABLE 5-1

| Toner No. | | External addition/mixing treatment 1 Device | Conditions | Type of external additive (parts by mass) |
|---|---|---|---|---|
| 1 | Toner particle 1 | HN | 2970 rpm · 11 min | Silica fine particles(0.5) |
| 2 | Toner particle 1 | HM | 2970 rpm · 11 min | Silica fine particles(0.5) |
| 3 | Toner particle 1 | HM | 2970 rpm · 9 min | Silica fine particles(0.5) |
| 4 | Toner particle 1 | HM | 2970 rpm · 9 min | Silica fine particles(0.5) |
| 5 | Toner particle 2 | HM | 2970 rpm · 9 min | Silica fine particles(0.5) |
| 6 | Toner particle 3 | HM | 2970 rpm · 9 min | Silica fine particles(0.5) |
| 7 | Toner particle 7 | HM | 2970 rpm · 9 min | Silica fine particles(0.5) |
| 8 | Toner particle 4 | HM | 2970 rpm · 9 min | Silica fine particles(0.5) |
| 9 | Toner particle 1 | HM | 2970 rpm · 9 min | Silica fine particles(0.5) |
| 10 | Toner particle 5 | HM | 2970 rpm · 9 min | Silica fine particles(0.5) |
| 11 | Toner particle 1 | HM | 2970 rpm · 9 min | Silica fine particles(0.5) |
| 12 | Toner particle 1 | HM | 2970 rpm · 9 min | Silica fine particles(0.5) |
| 13 | Toner particle 1 | HM | 2970 rpm · 9 min | Silica fine particles(0.5) |
| 14 | Toner particle 1 | HM | 2970 rpm · 11 min | Silica fine particles(0.5)/ Silica fine particles/Fatty acid metal salt-silica composite particles 1(1.4) |
| 15 | Toner particle 1 | HM | 2970 rpm · 11 min | Silica fine particles(0.5)/ Silica fine particles/Fatty acid metal salt-silica composite particles 1(0.1) |
| 16 | Toner particle 1 | HM | 2970 rpm · 11 min | Silica fine particles(0.5) |
| 17 | Toner particle 1 | HM | 2970 rpm · 11 min | Silica fine particles(0.5) |
| 18 | Toner particle 1 | HM | 2970 rpm · 11 min | Silica fine particles(0.5) |
| 19 | Toner particle 1 | HM | 2970 rpm · 11 min | Silica fine particles(0.5) |
| 20 | Toner particle 1 | HM | 2970 rpm · 9 min | Silica fine particles(0.5) |
| 21 | Toner particle 1 | HM | 2970 rpm · 9 min | Silica fine particles(0.5) |

TABLE 5-1-continued

| Toner No. | | External addition/mixing treatment 1 Device | Conditions | Type of external additive (parts by mass) |
|---|---|---|---|---|
| 22 | Toner particle 6 | HM | 2970 rpm · 9 min | Silica fine particles(0.5) |
| 23 | Toner particle 1 | HM | 2970 rpm · 9 min | Silica fine particles(0.5) |

TABLE 5-2

| Toner | External addition/mixing treatment 2 | | | External addition/mixing treatment 3 | |
|---|---|---|---|---|---|
| No. | Device | Conditions | Type of external additive (parts by mass) | Device | Conditions |
| 1 | HM | 2970 rpm · 1 min | Fatty acid metal salt A1(0.10) | FIG. 1 | 1100 rpm · 3 min |
| 2 | HM | 2970 rpm · 1 min | Fatty acid metal salt A1(0.20) | FIG. 1 | 1100 rpm · 3 min |
| 3 | HM | 3000 rpm · 1 min | Fatty acid metal salt A1(0.10) | FIG. 1 | 1100 rpm · 5 min |
| 4 | HM | 3000 rpm · 1 min | Fatty acid metal salt A1(0.20) | FIG. 1 | 1100 rpm · 5 min |
| 5 | HM | 3000 rpm · 1 min | Fatty acid metal salt A1(0.10) | FIG. 1 | 1100 rpm · 5 min |
| 6 | HM | 3000 rpm · 1 min | Fatty acid metal salt A1(0.10) | FIG. 1 | 1100 rpm · 5 min |
| 7 | HM | 3000 rpm · 1 min | Fatty acid metal salt A1(0.10) | FIG. 1 | 1100 rpm · 5 min |
| 8 | HM | 3000 rpm · 1 min | Fatty acid metal salt A1(0.10) | FIG. 1 | 1100 rpm · 5 min |
| 9 | HM | 3000 rpm · 1 min | Fatty acid metal salt A5(0.10) | FIG. 1 | 1100 rpm · 5 min |
| 10 | HM | 3000 rpm · 1 min | Fatty acid metal salt A1(0.10) | FIG. 1 | 1100 rpm · 5 min |
| 11 | HM | 3000 rpm · 1 min | Fatty acid metal salt A2(0.10) | FIG. 1 | 1100 rpm · 5 min |
| 12 | HM | 3000 rpm · 1 min | Fatty acid metal salt A3(0.10) | FIG. 1 | 1100 rpm · 5 min |
| 13 | HM | 3000 rpm · 1 min | Fatty acid metal salt A4(0.10) | FIG. 1 | 1100 rpm · 5 min |
| 14 | — | — | — | — | — |
| 15 | — | — | — | — | — |
| 16 | HM | 2970 rpm · 4 min | Fatty acid metal salt A1(0.10) | — | |
| 17 | HM | 2970 rpm · 4 min | Fatty acid metal salt A1(0.30) | — | — |
| 18 | HM | 2970 rpm · 1 min | — | FIG. 1 | 1100 rpm · 3 min |
| 19 | HM | 2970 rpm · 1 min | — | — | — |
| 20 | HM | 2970 rpm · 1 min | Fatty acid metal salt A1(0.30) | FIG. 1 | 1100 rpm · 5 min |
| 21 | HM | 2970 rpm · 1 min | Fatty acid metal salt A1(0.05) | FIG. 1 | 1100 rpm · 5 min |
| 22 | HM | 2970 rpm · 1 min | Fatty acid metal salt A1(0.10) | FIG. 1 | 1100 rpm · 5 min |
| 23 | HM | 2970 rpm · 1 min | Fatty acid metal salt A1(0.20) | FIG. 1 | 1100 rpm · 1 min |

TABLE 6

| | | Coverage ratio S(A) of fatty acid metal salt A based on SEM observation | Coverage ratio X(A) of fatty acid metal salt based on ESCA | S(A)/ X(A) | Fixing ratio (%) of fatty acid metal salt A |
|---|---|---|---|---|---|
| Toner 1 | Toner particle 1 | 0.06 | 0.085 | 0.706 | 50 |
| Toner 2 | Toner particle 1 | 0.16 | 0.173 | 0.925 | 50 |
| Toner 3 | Toner particle 1 | 0.03 | 0.120 | 0.250 | 70 |
| Toner 4 | Toner particle 1 | 0.08 | 0.220 | 0.364 | 70 |
| Toner 5 | Toner particle 2 | 0.03 | 0.120 | 0.250 | 70 |
| Toner 6 | Toner particle 3 | 0.03 | 0.120 | 0.250 | 70 |
| Toner 7 | Toner particle 7 | 0.03 | 0.120 | 0.250 | 70 |
| Toner 8 | Toner particle 4 | 0.03 | 0.120 | 0.250 | 70 |
| Toner 9 | Toner particle 1 | 0.03 | 0.120 | 0.250 | 70 |
| Toner 10 | Toner particle 5 | 0.03 | 0.120 | 0.250 | 70 |
| Toner 11 | Toner particle 1 | 0.03 | 0.120 | 0.250 | 70 |
| Toner 12 | Toner particle 1 | 0.03 | 0.120 | 0.250 | 70 |
| Toner 13 | Toner particle 1 | 0.03 | 0.120 | 0.250 | 70 |
| Toner 14 | Toner particle 1 | 0.90 | 1.000 | 0.900 | 80 |
| Toner 15 | Toner particle 1 | 0.02 | 0.100 | 0.200 | 80 |
| Toner 16 | Toner particle 1 | 0.02 | 0.100 | 0.200 | 60 |
| Toner 17 | Toner particle 1 | 0.06 | 0.300 | 0.200 | 60 |
| Toner 18 | Toner particle 1 | — | — | — | — |
| Toner 19 | Toner particle 1 | — | — | — | — |
| Toner 20 | Toner particle 1 | 0.15 | 0.342 | 0.439 | 60 |
| Toner 21 | Toner particle 1 | 0.015 | 0.060 | 0.250 | 70 |

TABLE 6-continued

| | | Coverage ratio S(A) of fatty acid metal salt A based on SEM observation | Coverage ratio X(A) of fatty acid metal salt based on ESCA | S(A)/ X(A) | Fixing ratio (%) of fatty acid metal salt A |
|---|---|---|---|---|---|
| Toner 22 | Toner particle 6 | 0.03 | 0.122 | 0.246 | 70 |
| Toner 23 | Toner particle 1 | 0.05 | 0.220 | 0.227 | 30 |

Production Examples of Toners 2 to 23

Toners 2 to 23 were produced in the same way as in the production example of Toner 1, but herein the type and number of added parts of external additives, the toner particle, the external addition apparatus, and the external addition conditions were modified as given in Tables 5-1 and 5-2. Table 6 sets out the physical properties of the obtained toners.

Evaluation methods and evaluation criteria are set out below. Table 7 sets out the evaluation results of each toner.

Evaluations were performed using a commercially available color laser printer (HP LaserJet Enterprise Color M611dn, by HP Inc.) having been partially modified. Specifically, the printer was modified so that it could operate even with just one color process cartridge fitted thereto, and was also modified so that process speed was higher than that in the original printer.

The toner was removed from the cyan cartridge, and was refilled instead with 325 g of toner to be evaluated. The cyan cartridge filled with the toner to be evaluated was fitted to the apparatus body, and an evaluation was carried out with no fitted cartridges except for the cyan cartridge.

Low-Temperature Fixability

The image forming apparatus and the toner cartridge were allowed to stand in a low-temperature, low-humidity environment (15° C./10% RH: hereafter LL environment) for 48 hours. Next, an image for density check (solid image) was outputted, while the fixation temperature was caused to vary, to ascertain the fixation temperature. The lowest temperature at which cold offset did not occur was taken as the fixation temperature, and an evaluation was carried out in accordance with the criteria below.

A: Fixation temperature lower than 170° C.

B: Fixation temperature from 170° C. to less than 180° C.

C: Fixation temperature from 180° C. to less than 190° C.

D: Fixation temperature of 190° C. or higher

Sticking of Ejected Paper after Fixing the image forming apparatus and the toner cartridge were allowed to stand in a high-temperature, high-humidity environment (32.5° C./80% RH: hereafter HH environment) for 48 hours. Then 100 prints of a solid image were continuously outputted and were allowed to stand on a paper ejection tray for 10 minutes, after which image sticking was checked.

A: No sticking observed

B: Slight sticking observed

C: Sticking observed.

D: Sticking occurred, which made peeling difficult

Development Streaks

Upon termination of the evaluation of solid image density, a halftone image (toner laid-on level: 0.3 $mg/cm^2$) was printed out on LETTER size XEROX 4200 paper (by XEROX Corporation, 75 $g/m^2$) in a high-temperature, high-humidity environment (32.5° C./80% RH: hereafter HH environment), and the presence or absence of vertical streaks on the halftone image, in the paper ejection direction was checked, and development streaks were evaluated as follows.

A: No occurrence

B: From 1 to 3 vertical streaks occurred in the paper ejection direction, on the image in the halftone portion.

C: From 4 to 6 vertical streaks occurred in the paper ejection direction, on the image in the halftone portion.

D: 7 or more vertical streaks occurred in the paper ejection direction, on the image in the halftone portion, or vertical streaks occurred that had a width equal to or greater than 0.5 mm.

Solid Image Density

The image forming apparatus and the toner cartridge were allowed to stand in a high-temperature, high-humidity environment (32.5° C./80% RH: hereafter HH environment) for 48 hours. Then 15,000 prints of an image having a print percentage of 1% were outputted. Thereafter, an image (solid image) for concentration check was outputted, and image density was checked.

A: Image density of 1.40 or higher

B: Image density from 1.35 to less than 1.40

C: Image density from 1.30 to less than 1.35

D: Image density lower than 1.30

Blotting

The image forming apparatus and the toner cartridge were allowed to stand in a high-temperature, high-humidity environment (15° C./10% RH: hereafter LL environment) for 48 hours. Then 15,000 prints of an image having a print percentage of 1% were outputted. Thereafter, a halftone image was outputted, and toner blotting was checked.

A: No blots at all on the image

B: Fewer than 10 blots on the image

C: From 10 to fewer than 30 blots on the image

D: 30 or more blots on the image

TABLE 7

| | | Low-temperature, low-humidity environment | High-temperature, high-humidity environment | | | Low-temperature, low-humidity environment |
|---|---|---|---|---|---|---|
| | | Low-temperature fixability | Ejected print sticking | Development streaks | Solid image density | Blotting |
| Example 1 | Toner 1 | A(155° C.) | A | A | A | A |
| Example 2 | Toner 2 | A(160° C.) | A | A | A | A |
| Example 3 | Toner 3 | A(155° C.) | A | B(Two sites) | A | A |
| Example 4 | Toner 4 | A(160° C.) | A | A | A | B(Three sites) |
| Example 5 | Toner 5 | A(165° C.) | A | B(Two sites) | A | A |
| Example 6 | Toner 6 | A(165° C.) | B | B(Two sites) | A | A |
| Example 7 | Toner 7 | A(165° C.) | B | B(Three sites) | B | A |
| Example 8 | Toner 8 | A(160° C.) | C | B(Three sites) | C | A |
| Example 9 | Toner 9 | A(160° C.) | A | B(Two sites) | A | A |
| Example 10 | Toner 10 | B(175° C.) | A | C(Four sites) | A | A |
| Example 13 | Toner 11 | A(160° C.) | A | C(Five sites) | A | B(Five sites) |
| Example 14 | Toner 12 | Å(160° C.) | A | C(Five sites) | A | C(Twelve sites) |
| Example 15 | Toner 13 | A(160° C.) | A | C(Five sites) | A | C(Fifteen sites) |
| Comparative example 1 | Toner 14 | D(190° C.) | A | A | C | D(Thirty -two sites) |
| Comparative example 2 | Toner 15 | A(160° C.) | A | D(Seven sites) | D | D(Thirty-five sites) |
| Comparative example 3 | Toner 16 | A(160° C.) | A | D(Seven sites) | A | A |
| Comparative example 4 | Toner 17 | C(180° C.) | A | D(Nine sites) | C | D(Thirty-two sites) |
| Comparative example 5 | Toner 18 | A(160° C.) | A | D(Eight sites) | A | A |
| Comparative example 6 | Toner 19 | A(160° C.) | A | D(Ten sites) | A | A |
| Comparative example 7 | Toner 20 | C(185° C.) | A | A | C | D(Thirty-one sites) |
| Comparative example 8 | Toner 21 | A(155° C.) | A | D(Seven sites) | A | A |
| Comparative example 9 | Toner 22 | D(195° C.) | A | A | A | A |
| Comparative example 10 | Toner 23 | A(160° C.) | A | D(Seven sites) | B | D(Thirty-three sites) |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-125630, filed Aug. 5, 2022 and Japanese Patent Application No. 2023-115035, filed Jul. 13, 2023 which are hereby incorporated by reference herein in their entirety.

What is claimed is:

1. A toner, comprising:

a toner particle, the toner particle comprising a binder resin and a monoester wax; and a fatty acid metal salt A being present on a surface of the toner particle, a content of fatty acid metal salt A being 0.06 to 0.25 parts by mass relative to 100 parts by mass of the toner particle wherein $$S(A) \geq 0.03$$

$$X(A) \leq 0.120 \text{ and}$$

$$0.248 \leq S(A)/X(A) \leq 1.000$$

when X(A) is a coverage ratio of the surface of the toner particle by the fatty acid metal salt A determined by X-ray photoelectron spectroscopy and S(A) is a coverage ratio of the surface of the toner particle by the fatty acid metal salt A determined by analysis of a scanning electron microscope image.

2. The toner according to claim 1, wherein the monoester wax is a condensation product of a fatty acid F1 and an alcohol A1, and the fatty acid metal salt A is a salt of a metal and a fatty acid F2 having a carbon number of 12 to 18, with the proviso that at least one of (a) and (b) is satisfied (a) a difference between a carbon number of fatty acid F1 and a carbon number of fatty acid F2 is 2 or less, and (b) a difference between a carbon number of alcohol A1 and a carbon number of fatty acid F2 is 2 or less.

3. The toner according to claim 2, wherein fatty acid F1 is an aliphatic monocarboxylic acid with a carbon number of 16 to 22, and alcohol A1 is an aliphatic monoalcohol with a carbon number of 16 to 24.

4. The toner according to claim 2, wherein of the metal in fatty acid metal salt A has a valence of 2 or more.

5. The toner according to claim 1, wherein the fatty acid metal salt A is at least one member selected from the group consisting of zinc stearate and aluminum stearate.

6. The toner according to claim 1, wherein the toner particle comprises an inorganic fine particle.

7. The toner according to claim 6, wherein the inorganic fine particle was surface-treated with a treatment agent having an alkyl group having a carbon number of 4 to 20.

8. The toner according to claim 7, wherein the inorganic fine particle is unevenly distributed in a vicinity of the surface of said toner particle.

9. An image-forming method, comprising:

a charging step of charging a surface of an electrostatic latent image bearing member;

an electrostatic latent image formation step of forming an electrostatic latent image on a surface of the charged electrostatic latent image bearing member;

a developing step of developing the electrostatic latent image with toner to form a toner image on the surface of the electrostatic latent image bearing member;

a transfer step of transferring the toner image from the electrostatic latent image bearing member to a transfer material; and a fixing step of fixing the toner image transferred on the transfer material by action of heat and pressure, wherein the toner is the toner according to claim 1, and the developing step is a developing step according to a mono-component contact development system.

10. A toner production method for producing the toner according to claim 1, the method comprising:

a step of selecting a treatment apparatus comprising a stirring member, a container and a drive member, and a treatment step of treating in the treatment apparatus a mixture comprising the toner particle and the fatty acid metal salt A;

the stirring member having a rotating member, and a plurality of stirring blades provided on a surface of the rotating member;

the container having a cylindrical inner peripheral surface and accommodating the stirring member; and the drive member is configured to apply a rotational driving force to the rotating member and thereby cause the stirring member to rotate within the container, wherein the plurality of the stirring blades are provided so that a gap is left with the inner peripheral surface of the container, and the stirring blades have a first stirring blade for, as a result of a rotation of the stirring member, feeding the mixture, having been charged into the container, towards one side in an axial direction of the rotating member, and a second stirring blade for feeding the mixture towards the other side in the axial direction.

11. The toner according to claim 1, wherein S(A)/X(A) is 0.360 to 1.000.

12. The toner according to claim 1, wherein a fixing ratio (%) of fatty acid metal salt A onto the toner particle is from 20 to 100.

13. The toner according to claim 6, wherein the inorganic fine particle is a magnetic body.

14. The image-forming method of claim 9, wherein the transfer step of transferring the toner image from the electrostatic latent image bearing member to a transfer material comprises using an intermediate transfer member.

* * * * *